United States Patent [19]
Furuhashi et al.

[11] Patent Number: 5,789,690
[45] Date of Patent: Aug. 4, 1998

[54] ELECTRONIC SOUND SOURCE HAVING REDUCED SPURIOUS EMISSIONS

[75] Inventors: Makoto Furuhashi, Kanagawa; Masakazu Suzuoki, Tokyo, both of Japan

[73] Assignee: Sony Corporation, Tokyo, Japan

[21] Appl. No.: 564,560

[22] Filed: Nov. 29, 1995

[30] Foreign Application Priority Data

Dec. 2, 1994 [JP] Japan ................. 6-300032

[51] Int. Cl.⁶ ............... G10H 1/00; G10H 1/46; G10H 7/04
[52] U.S. Cl. ............... 84/633; 84/604; 84/605; 84/665
[58] Field of Search ............... 84/605–606, 630, 84/633, 665, 620

[56] References Cited

U.S. PATENT DOCUMENTS

| | | | |
|---|---|---|---|
| 5,052,685 | 10/1991 | Lowe et al. | 273/460 |
| 5,086,475 | 2/1992 | Kutaragi et al. | 381/36 |
| 5,111,530 | 5/1992 | Kutaragi et al. | 395/20 |
| 5,258,574 | 11/1993 | Kawano | 84/661 |
| 5,430,241 | 7/1995 | Furuhashi et al. | 84/603 |

*Primary Examiner*—William M. Shoop, Jr.
*Assistant Examiner*—Marlon T. Fletcher
*Attorney, Agent, or Firm*—Hill & Simpson

[57] ABSTRACT

An electronic sound source comprises an adder which calculates a sum of volume data and differential volume data in response to each clock signal supplied at equal intervals of time and transfers it to a limiter and a volume register. The sum volume data is then limited to a predetermined value by the limiter and passed across a volume register to a volume controller where it is multiplied by an output of a mute processor.

11 Claims, 25 Drawing Sheets

REFERENCE TABLE

| SCORE ID | SCORE DATA ID | ADDRESS | POINTER |
|---|---|---|---|
| 1 | P-1 | — | pt1 |
| 2 | P-2 | — | pt2 |
| 3 | P-3 | — | pt3 |
| 4 | — | ADDR1 | pt4 |
| 5 | — | ADDR2 | pt5 |
| --- | --- | --- | --- |

FIG.17A

START ADDRESS REFERENCE TABLE

| SCORE DATA ID | START ADDRESS |
|---|---|
| P | SADDR1 |
| Q | SADDR2 |
| --- | --- |

FIG.17B

OFFSET REFERENCE TABLE

| SCORE DATA ID | OFFSET ADDRESS |
|---|---|
| P-1 | 0 |
| P-2 | OADDR1 |
| P-3 | OADDR2 |
| --- | --- |

FIG.17C

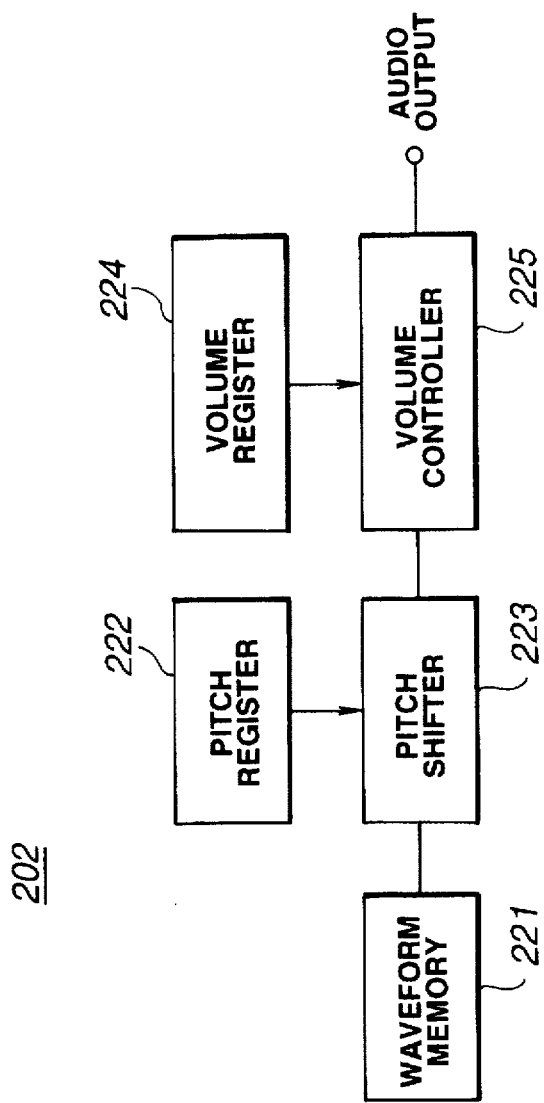

ELECTRONIC SOUND SOURCE HAVING REDUCED SPURIOUS EMISSIONS

BACKGROUND OF THE INVENTION

1. Field of the Invention

The present invention relates generally to the field of electronic sound source generators and, more particularly, the present invention relates to an electronic sound source having reduced spurious emissions and noise for use in video games or other electronic devices.

2. Description of the Prior Art

In conventional electronic devices, special effects sounds and BackGround Music (BGM) are played back in response to interaction with game software by an operator. In conventional video game machines, the sound source device is typically in the form of an FM sound source for generating sounds of a scale by varying the frequency of a waveform comprising a fundamental wave and its harmonics. Alternately, a PCM sound source device is used for producing a desired scale of sound by changing the period of reading a corresponding waveform to the desired scale from a fundamental waveform stored in memory. In order to produce background music (BGM) sound, a time sequence of score data which has been prepared and aligned includes various sound data such as scales, emission and termination of sound, sound effects and music as well as time data. These are interpreted in real time while controlling in succession the sound scale, emission and termination registers in the sound source.

The preparation of BGM sound data in the form of score data allows ease in the changing of tones and scale of sound during reproduction as compared with controlling the scale emission and termination of sounds through implementing programs in the sound source. Accordingly, this method is well-suited for video game machines and the like where real-time actions are needed in quick response in order to react to operator interaction with the machine. A conventional system for producing sounds is shown in FIG. 24 wherein a central processing unit (CPU) 201 controls a sound source device provided with score data for use in a video game machine such that a sequence of the score data is retrieved at equal intervals of time through time division multiplexing of the CPU. The CPU 201 is utilized for controlling timing duration scale and level of sound at the sound source device 202 to emit BGM sound. The method of interpreting the score data through time division multiplexing of the CPU is less costly as no particular peripheral devices are required provided that the CPU 201 has substantial processing capability.

When the sound source device 202 in a video game machine uses a PCM sound source, the level of the reproduced sound is specified as volume data by the CPU 201. More particularly, the sound source 202 comprises a waveform memory 221 for storing waveform data, a pitch register 222 for holding pitch data determined by the CPU 201, a pitch shifter for changing the pitch of the waveform stored in the waveform memory according to the pitch data held in the pitch register 222 and a volume register 224 for holding volume data determined by the CPU 201. Additionally, a volume controller 225 changes the level of an output from the pitch shifter 223 according to the volume data held in the volume register.

As shown in FIG. 25, upon receiving a request for emission of a particular sound, the CPU 201 supplies corresponding pitch data to the pitch register 222 and corresponding volume data to the volume register 224. As shown in FIG. 26(c) when the pitch and volume data are given at a time t30 the pitch shifter 223 changes the pitch of a waveform from the waveform memory 221 according to the pitch data from the pitch register 222 as shown in FIG. 26(a). This transfers a pitch changed waveform to the volume controller 225. The volume controller 225 then changes the level of waveform output from the pitch shifter 223 according to the volume data from the volume register 224 as shown in FIG. 26(b). Consequently, a sound corresponding to the pitch and volume data determined by the CPU 201 is then played back.

In these conventional devices, however, the changing level of the waveform output of the pitch shifter 223 in the volume register 225 is executed through multiplication of the output of the pitch shifter 223 by the volume data from the volume register 224. The resultant output of the volume controller is thus discontinuous at a time t30 when the volume level is changed. Because the output of the volume controller 225 is not continuous, it often results in the introduction of unwanted sounds such as pop and additional noise in the reproduced sound. These additional noises are undesirable.

In order to prevent the introduction of such noise, it has previously been proposed to change the volume data gradually. In such devices, the CPU has been responsible for changing the volume data in sequence and this significantly increases the load on the CPU. Furthermore, in a sound source having a pair of volume registers 224 and volume controllers 225 for each of the two left and right channels, a panning action may be requested in order to simulate a shift of sound from left to right or visa versa. In general, the panning action is implemented by gradually changing the volume level between the left and right channels. There have been increased demands in conventional video games to execute the shift of sound from left to right or visa versa promptly or at a higher rate of speed. This demand cannot be anticipated and therefore no preparation for such change can be made. Therefore, it is often difficult for the CPU to adequately make such a change.

In light of the foregoing, it is an object of the present invention to provide a sound source device in which the load on the CPU of the electronic device associated with the sound source is not increased and one in which the noise in a reproduced sound is actually decreased.

SUMMARY OF THE INVENTION

The sound source device according to the present invention comprises a waveform buffer for storing waveform data, a pitch memory for holding pitch data, a pitch shifter for reading waveform data from the waveform buffer and changing the pitch according to the pitch data held in the pitch memory. An amplitude memory holds volume data and a level controller receives an output of the pitch shifter in order to adjust its level according to the volume data held in the amplitude memory. A differential amplifier memory holds differential volume data and a volume changer changes the volume data in the amplitude memory according to the differential volume data held in the differential amplitude memory.

In the sound source device of the present invention, while the pitch data, volume data and differential volume data are predetermined, the pitch shifter reads out a desired waveform from the waveform buffer and changes its pitch according to the pitch data from the pitch memory before transferring it to the level controller. The level controller then adjusts the level of an output of the pitch shifter according to the volume data from the amplitude memory. Meanwhile the volume changer modifies the volume data stored in the amplitude memory according to the differential volume data stored in the differential amplitude memory. Consequently as the volume data stored in the amplitude memory is gradually modified according to the differential volume data from the differential amplitude memory during activation of the differential volume data, the output level of the pitch shifter can be varied gently by the level controller. Furthermore, if the differential volume data is not called for, the output level of the pitch shifter is adjusted according to the volume data directly from the amplitude memory with no use of the volume data changing action of the volume changer. The resultant output is free of unwanted noise, providing a clearer, cleaner signal.

BRIEF DESCRIPTION OF THE DRAWINGS

FIGS. 17 A-C are diagrams which illustrate the contents of a reference table for use during reading of the score data;

FIG. 25 is a block diagram showing an arrangement of a known sound source device in a conventional video game machine;

DETAILED DESCRIPTION OF A PREFERRED EMBODIMENT

In the preferred embodiment of the present invention, the sound source device is incorporated into a video game machine for generating both background and special effects sounds for a video game. The video game responds to commands from an operator for reading and executing a computer game program. A block diagram of a preferred embodiment of the present invention is set forth in FIG. 1.

Figure 1:
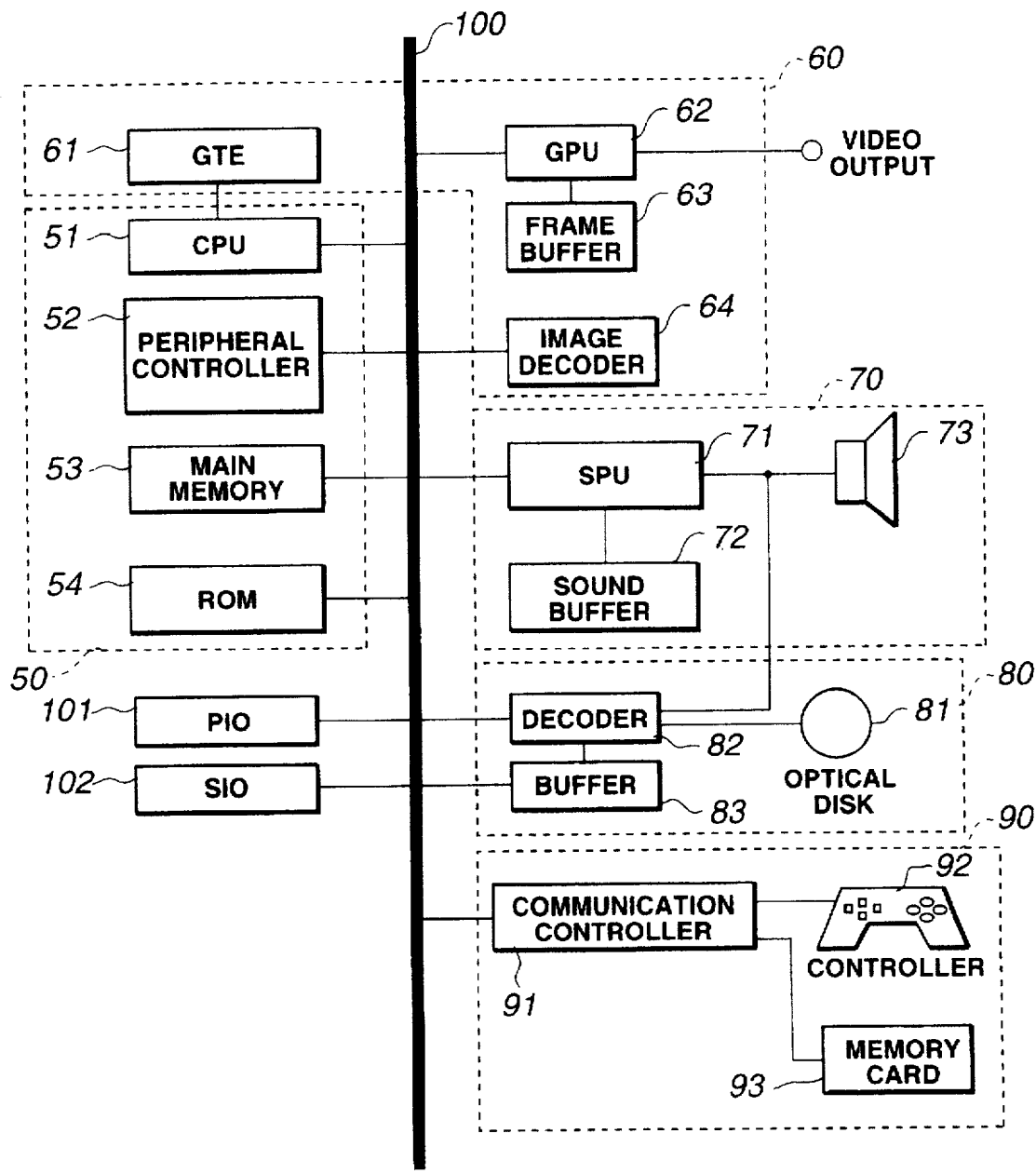
FIG. 1 is a schematic block diagram which illustrates a circuit arrangement of a video game machine that embodies a sound source controller of the present invention.

In FIG. 1, a video game embodying the present invention comprises a control system 50 having a central processing unit (CPU) 51 and its related peripheral devices. A graphics display section 60 has a graphics processing unit (GPU) 62 which is connected to a frame buffer 63. A sound generation system 70 has a sound processing unit (SPU) 71 for generating background music and special effects sounds. An optical disc controller/reader module 80 controls reading of data stored on a digital optical compact disc which is typically the computer software for the game along with image and sound data. A communications controller module 90 controls input and output of commands from a controller 92 manipulated by the operator. The communications controller module 90 also controls the transfer of information from an auxiliary memory 93 which stores information that, for example, comprises the settings for the game as well as sound and image information. A data bus 100 extends from the control system 50 to the communications control module 90 and interconnects the various modules.

In addition to the CPU 51, the control system 50 also includes a peripheral device controller 52 which controls interrupts of the microprocessor as well as Direct Memory Access (DMA) transfers. A main memory 53 is comprised of RAM and a ROM 54 carries software programs including the operating system for controlling operation of the graphics system 60 and the sound system 70. The CPU 51 operates the operating system stored in the ROM for controlling the entire machine.

The graphics system 60 is comprised of a Geometry Transfer Engine (GTE) 61 for performing coordinate transformation or the like. The GPU 62 draws images in response to commands from the CPU 51. A frame buffer 63 stores images drawn by the GPU 62 and a video decoder 64 decodes coded image data which is compressed by orthogonal transformations such as a discrete cosine transformation. The GTE 61 has a parallel computing mechanism for performing a plurality of arithmetic operations simultaneously. The GTE 61 performs high speed coordinate transfer operations, light source calculations or matrix or vector calculations upon receiving a calculation command from the CPU 51. More particularly, the GTE 61 calculates the coordinates of polygons up to 1.5 million times per second for flat shading of the polygons for a triangle shape in a single color. This contributes to a decrease in the load on the CPU 51 and allows the video game to perform high-speed operations.

The GPU 62 is responsive to a drawing command from the CPU 51 for drawing a polygon or graphic on the frame buffer 63. The GPU 62 processes up to 360,000 polygons for a single drawing. The frame buffer 63 comprises a so-called dual port RAM for simultaneously receiving data from the GPU 62 or the main memory and outputting data to the display. The frame buffer 63 has a 1 megabyte capacity which represents a 16-bit pixel matrix having a resolution of 1024 along the horizontal and 512 in the vertical. Any desired area in the matrix of the frame buffer 63 can be released as a video output.

Additionally, the frame buffer 63 includes an area for storage of a Color LookUp Table (CLUT) which is used as a reference in processing image data. For example, this may include polygons of the GPU for drawing and a texture area for storage of texture data mapped to the polygons produced by the GPU 62. The CLUT and texture area can be varied dynamically depending on changes in the display area.

In addition to flat shading, the GPU 62 performs Gourad shading in which the color of a polygon is determined by interpolation of vertex colors, and texture mapping for applying texture data stored in the texture area of a polygon. In Gourad shading or texture mapping, the GTE 61 calculates the coordinates of up to 0.5 million polygons in one second. The decoder is responsive to a command from the CPU 51 for decoding still or motion image data retrieved from the main memory 53 and storing them again in the main memory 53. The decoded data may be used as the background of a graphic produced by the GPU 62 as having been transmitted via the GPU 62 to the frame buffer for storage.

The sound system 70 comprises the Sound Processing Unit (SPU) 71 which is responsive to commands from the CPU 51 for generating background music or special effects sound. In the sound system 70, a sound buffer 72 stores waveform data from the SPU 72, and a loud speaker 73 emits the background music or special effects sound generated by the SPU 71. The SPU 71 is capable of performing adaptive differential pulse code modulation (ADPCM) decoding for reproducing audio data in ADPCM format by transforming from a 16-bit word to a 4-bit differential form. The SPU also performs a playback function for retrieving waveform data from the sound buffer 72 to generate a corresponding sound as well as a modulation function for modulating the waveform stored in the sound buffer 72. Accordingly, the sound system 70 acts as a sampling sound source and upon receiving a command from the CPU 51 produces background music or special effect sounds corresponding to the waveform data supplied from the sound buffer 72.

The optical disk controller module 80 comprises an optical disk 81 for reproducing a computer program or other data stored in an optical disk. The disc controller module 80 includes a decoder 82 for decoding the computer program or other data contained on the disc. For example, this decoder includes a mechanism for decoding the error correction code (ECC) form of the data. The disc controller module 80 also includes a buffer 83 for accelerating the reading of data from the optical disk by temporarily storing reproduced data from the optical disk device 81.

It is understood that the audio data stored in an optical disk and produced by the optical disk device 81 is not limited to the ADPCM format but may also be in PCM form as produced by analog-to-digital conversion of audio signals. If ADPCM audio data which is encoded as a 4-bit differential from a 16-bit digital (PCM) data is read, it is decoded by the decoder 82 and expanded back to a 16-bit digital word for storage in the SPU 71. Alternatively, when PCM data is read, e.g. 16-bit digital format, it is decoded by the decoder 82 and fed into the SPU 71 or it is directly transferred to drive the loud speaker 73.

The communications controller module 90 comprises a communications controller 91 for controlling transfer of data across the bus 100 to and from the CPU 51. A controller 92 enters commands from the operator, and a memory card 93 stores game setting data. The controller 92 has 16 instruction keys for entry of the operator's instructions and upon receiving a command from the communications controller 91, it transmits instruction data assigned to the keys to the communications controller 91 at a rate of 60 times per second in synchronous mode. The communications controller 91 further transfers the instruction data from the controller 92 to the CPU 51. As a result, the CPU 51 receives the operator's instruction and performs its corresponding actions according to the game program instructions.

In order to store the game settings in memory, they are delivered from the CPU 51 to the communications controller 91 which in turn stores them on the memory card 93. The memory card 93 is connected by the communications controller 91 to the bus 100. Because the memory card 93 is separated from the bus 100, it can be removed from the machine while the machine is being energized. This allows exchange of multiple memory cards 93 for carrying different games or game settings.

The bus 100 is also connected to a parallel I/O (output/input) port 101 and a serial I/O port 102 of the video-game machine. The video-game machine can thus be connected via the parallel I/O port 101 to any peripheral device and at the serial I/O port 102 to another video-game machine. It is necessary for the video-game machine to transfer huge amounts of image data at high speed between the main memory 53, the GPU 62, the video decoder 64, and the decoder 82 for reading a program and displaying or drawing a desired image. For this purpose, the video-game machine performs direct data transfer or DMA transfer between the main memory 53, the GPU 62, the video decoder 64, and the decoder 82 without passing the CPU 51 by means of the controlling action of the peripheral device controller 52. This arrangement decreases the load on the CPU 51 and also permits the data to be transferred at a higher speed.

Upon powering up the video-game machine, its CPU 51 actuates the operating system stored in ROM 54. While the operating system is being actuated, the CPU 51 controls the operations of the graphic system 60 and the sound system 70. More specifically, the CPU 51 upon starting the operating system, initializes the entire machine by checking every device and drives the optical disk controller module 80 for performing read-out of a game program from the optical disk. When the game program starts, the CPU 51 controls the graphic system 60 and sound system 70 in response to commands from the operator for displaying images and emitting the corresponding music or special effects sounds.

In order to produce the corresponding music or special effects sounds for an image, the video-game machine has a sound source for generating music and special effects sounds and a sound source controller which is responsive to commands from the operators for controlling the action of the sound source. In practice, the sound source controller is implemented by a combination of operations performed by the CPU 51 and SPU 71. However, it is substantially controlled by the CPU 51.

Figure 2:
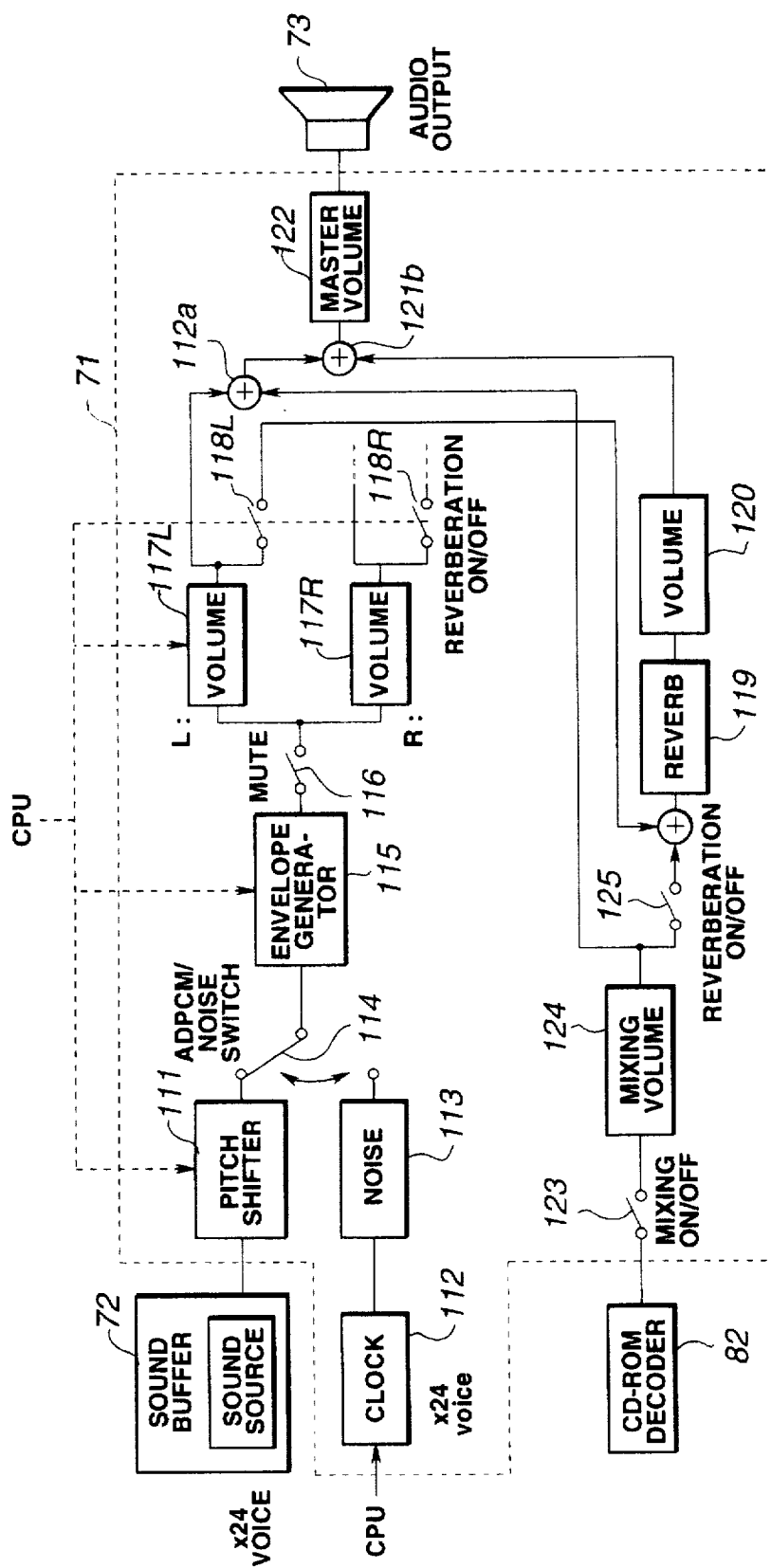
FIG. 2 is a schematic block diagram which illustrates a Sound Processing Unit (SPU) for use with a video game machine that embodies the sound source controller of the present invention.

As shown in FIG. 2, the SPU 71 comprises a pitch shifter 111 for reading a waveform from the sound buffer 72 and changing its pitch in response to a command from the CPU 51. A clock generator 112 produces a clock signal for synchronizing operations. A noise generator 113 is responsive to an output of the clock generator 112 for producing a noise. A selector switch 114 switches between outputs of the pitch shifter 111 and the noise generator 113. An envelope generator 115 produces an envelope of sound data by varying the amplitude of a waveform output of the switch 114 through level controlling. A mute processor 116 switches the sound on and off, and two, left and right, volume devices 117L and 117R adjust the intensity or balance between the left and right channels.

The sound buffer 72 holds a number of waveforms of a period length representing sounds. The waveforms are stored in the form of 4-bit ADPCM data described previously and after read out, are converted into 16-bit PCM format by the SPU 71 before being transmitted to the pitch shifter 111. This allows the waveform storage area of the sound buffer 72 to be undersized as compared with direct storage of the PCM data and a greater number of waveforms can be stored. The main memory 53 holds the envelope of sound data, such as rise and decay of the waveform, corresponding to a period length of the waveform stored in the sound buffer 72. Although FIG. 2 shows a circuitry arrangement for handling a piece of sound (one voice), the connection from the pitch shifter 111 to the volume devices 117L and 117R is made in multiplicity for 24 voices. The outputs of the multiple volume devices 117L and 117R are joined together to an output of two, left and right, channels. In the sound source device of the present invention, 24 different voices are produced and emitted at the same time. It is also possible that the waveform in the sound buffer 72, envelope, intensity, and balance between the left and right channels of each voice are modified independently. Accordingly, the sound source device can utilize multiple voices to produce a harmony or simulate playing with a plurality of instruments.

The sound source device is also capable of reverberation processing in which a series of time lagged audio outputs are combined together. More specifically, the CPU 71 further comprises two switches 118L and 118R for determining whether or not a group of 24 voice outputs is to be reverberation processed. A reverberation processor 119 for time lagging the voice outputs of the switch 118L from one another, a volume device 120 for controlling the intensity of the time lagged voice outputs, an adder 121b for mixing an output of the volume device 120 with the original, not lagged voice outputs, and a master volume device 122 for controlling the intensity of a mixture output of the adder 121b operate to perform reverberation processing.

The sound source device is also adapted for mixing the prescribed voice outputs with another audio signal retrieved from an optical disk and supplied by the decoder 82. More particularly, the SPU 71 further comprises a switch 123 for selecting the mixing of the additional audio signal from an optical disk having voice outputs. A mixing volume device 124 controls the intensity of the audio signal before transmission to an adder 121a, and a switch 125 selectively subjects the audio signal to reverberation processing. The interconnection of the reverberation processor 119, volume control 120, and mixing volume device 124 shown in FIG. 2 are shown for the left channel. Similar devices are connected for the right channel but are not shown in the illustration for the sake of clarity.

Operation of the sound source device of the preferred embodiment will now be explained. When emission of a sound is requested, the CPU 51 delivers a selection signal for selecting and reading a waveform corresponding to the sound together with a desired pitch of the sound from the sound buffer 72. This is then transferred to the pitch shifter 111. The CPU simultaneously retrieves an envelope corresponding to the selected waveform from the main memory 53 and then transfers the sound to the envelope generator 115. In response, the pitch shifter 111 performs reading of the waveform by varying a waveform reading step with reference to the pitch. Also, the pitch shifter 111, upon completing the reading of the waveform of one period length, then repeats reading of the waveform so long as emission of the sound is being requested. Subsequently, the waveform data of the pitch is produced while the request for the sound is being received. The waveform data is supplied by the switch 114 to the envelope generator 115.

The envelope generator 115 modifies the amplitude of the waveform data from the pitch shifter 111 according to the envelope supplied by the CPU 51. As the result, audio data for one voice is generated. In a similar manner, the remaining 23 voices of audio data are produced. The voice data are then controlled in intensity and balance between the left and right channels with the volume devices 117L and 117R and if desired, subjected to reverberation processing before being mixed together. Finally, the sound data requested by the CPU 51 is released.

Figure 3:
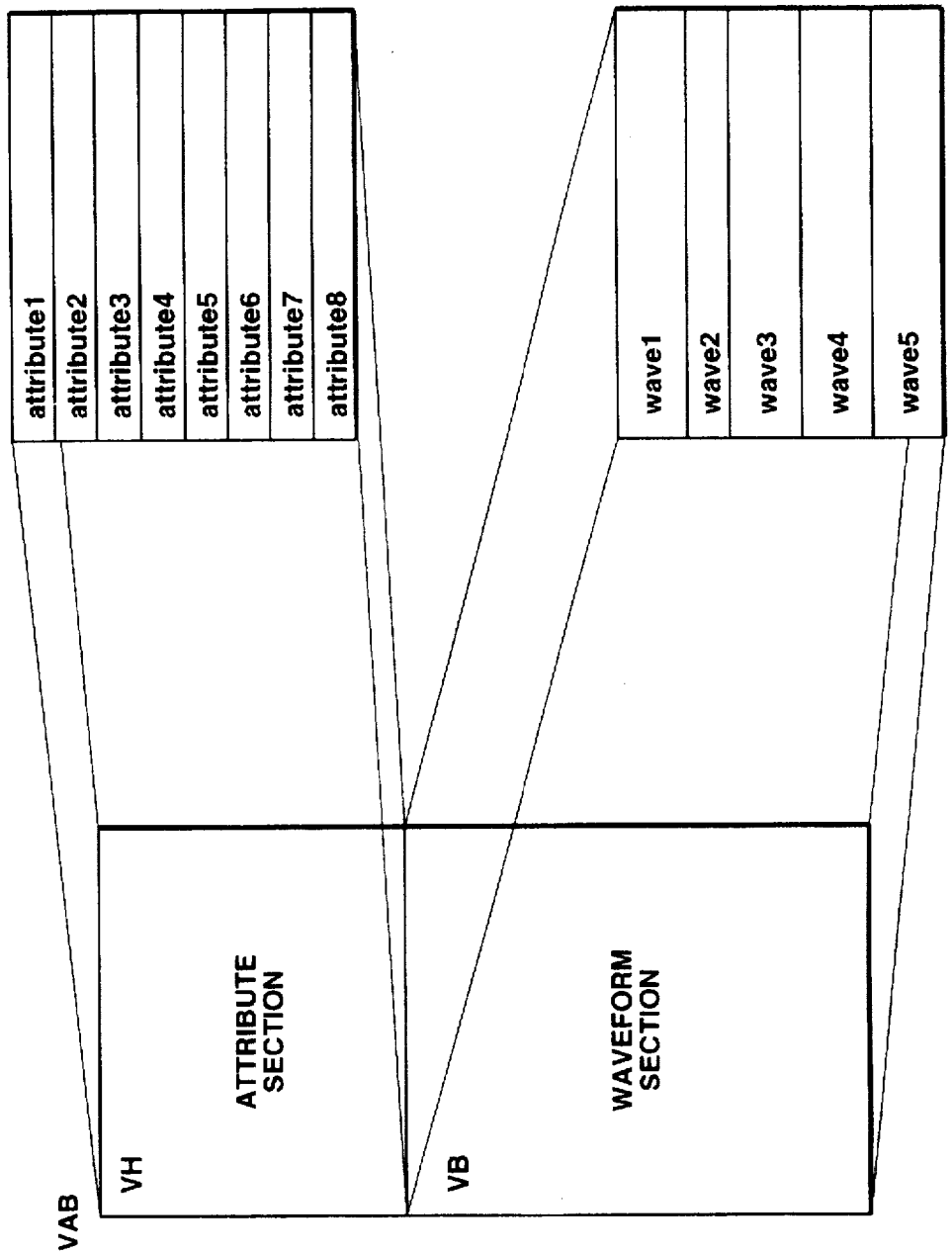
FIG. 3 is a diagram showing a format of a data bank used in the sound source controller and a sound source of the present invention.
Figure 4:
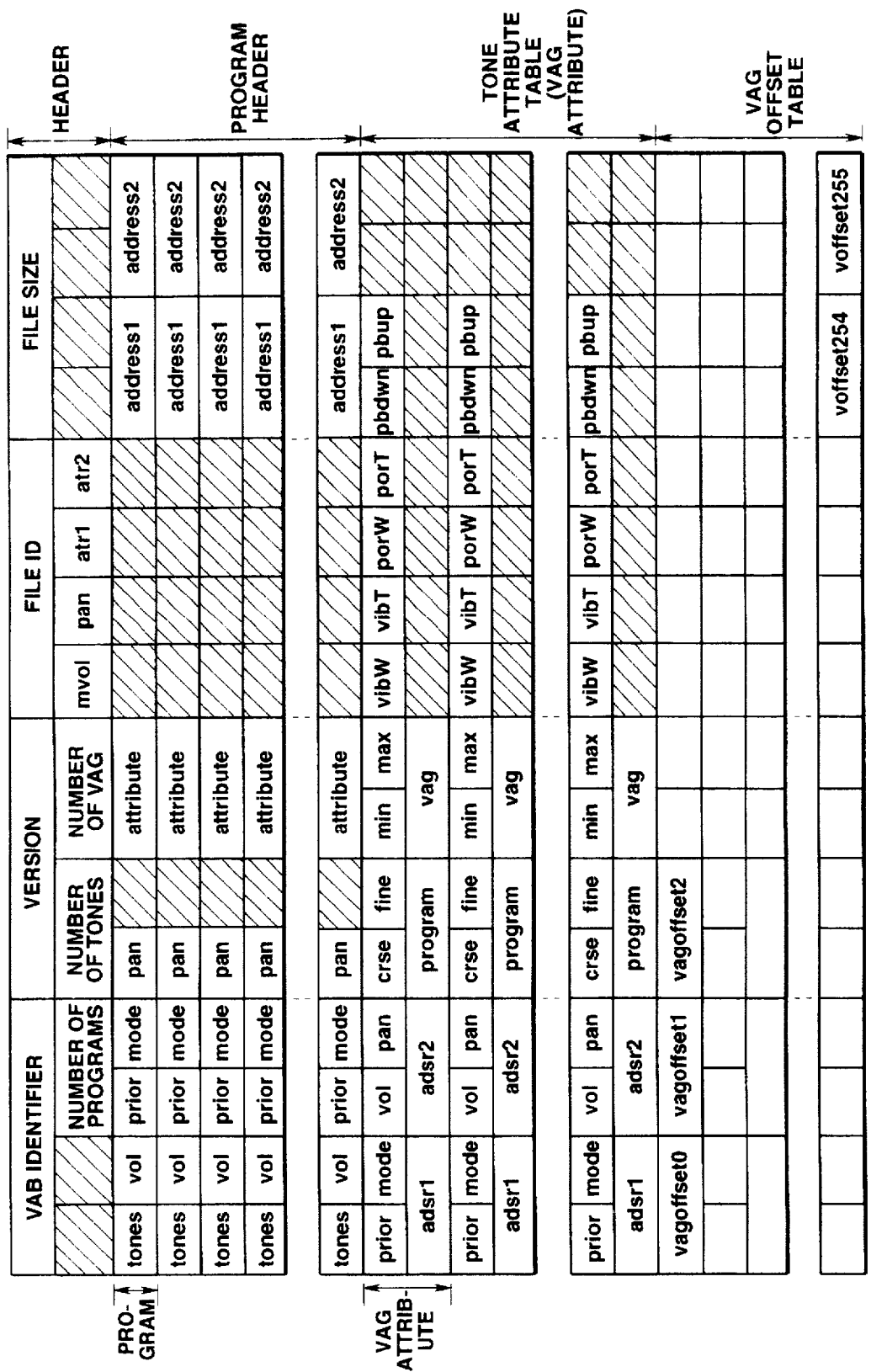
FIG. 4 is a diagram showing a format of attribute data assigned in the data bank illustrated in FIG. 3.

Information including waveform data and envelope data for generating the audio data of each voice is stored on an optical disk or recording medium in the form of a bank of files which contain setting elements (programs) of the waveform and envelope data. As shown in FIG. 3, the bank may comprises an attribute section (bank header) VH and a waveform section VB. The waveform section VB contains compressed waveform data (referred to as the "wave") and the bank header VH contains attribute data (referred to as an "attribute") attributed to the compressed waveform data (VAG). The attribute data need not correspond to the waveform data on a one-to-one basis. Preferably, a plurality of attributes may be assigned to one single waveform. Thus there is a greater number of attributes than waveform data, as shown in FIG. 3. Also, the bank header VH comprises a VAB header, a program header, a tone attribute table (VAG attribute table), and a VAG offset table, as shown in FIG. 4. The VAB header includes a VAB identifier for identifying the file as a bank VAB, a file ID for identifying each VAB file, a file size for representing a size of the file of bank VAB, a program number for indicating the number of programs, a tone number for indicating the number of VAG attribute sets, a VAG number for showing the number of VAG data, a master volume level ("mvol") for indicating a level of the master volume device 122, and a master pattern ("pan") for representing the master pan level.

The program header includes a plurality of programs and the tone attribute table includes a plurality of tone attributes. A group of the tone attributes (VAG attributes) are assigned to each program in a given sound range. The program comprises a tone ("tone") indicating the number of the VAG attributes in the program, master volume ("vol") of the program, priority ("prior") of the program, mode ("mode")

of the sound source, master pan level ("pan") of the program, attribute ("attribute") of the program, and addresses ("address 1, 2").

The VAG attribute comprises priority ("prior"), volume ("vol"), and panpot ("pan") of the VAG attribute, center note ("crsc") indicating a center tone of the sound, fine tuning ("fine") for pitch correction, minimum and maximum ("min", "max") of the sound, width and period ("vibW", "vibT") of vibration, width and duration ("porW", "porT") of portamento, minimum and maximum ("pbmin", "pbmax") of pitch bend for changing the pitch, settings ("adsr 1, 2") of envelope, program ("program") including its VAG attributes, and identifier ("vag") for the (VAG) waveform data of the VAG attribute.

Figure 5:
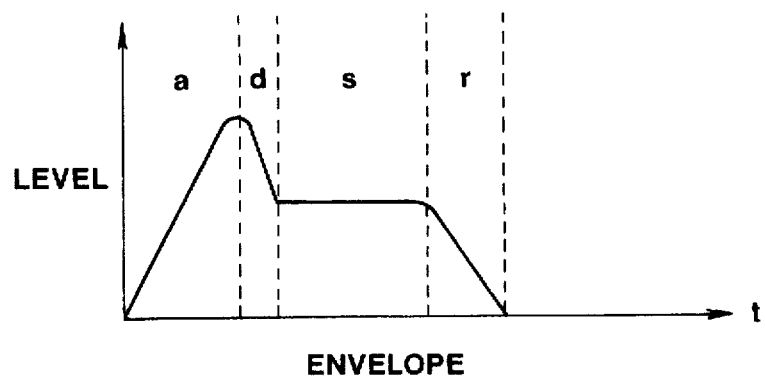
FIG. 5 is a diagram explaining the settings of an envelope allocated to the attribute data.
Figure 6:
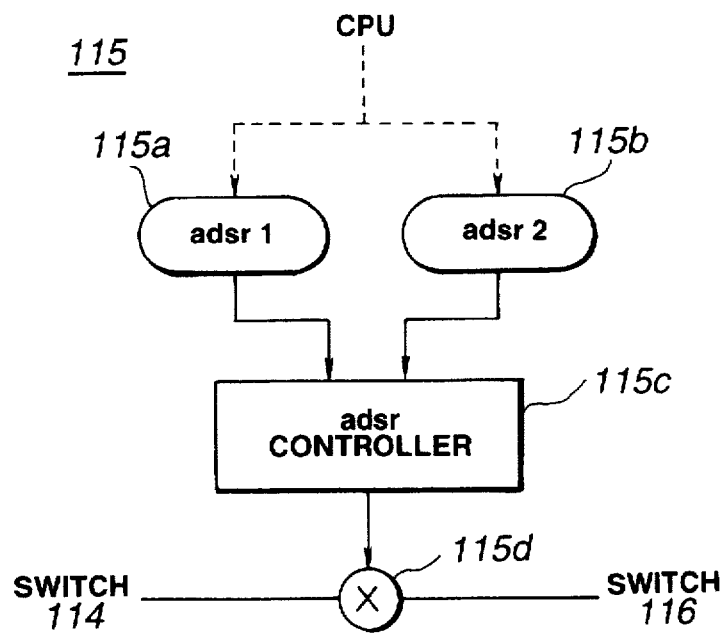
FIG. 6 is a schematic block diagram which illustrates an envelope generator for use in the sound source controller of the present invention.

The settings "adsr 1, 2" of the envelope indicate an attack ("attack"), decay ("decay"), hold ("sustain"), and release ("release") of the envelope, as shown in FIG. 5. The envelope generator 115 uses "adsr 1, 2" for controlling the output level of the pitch shifter 111. As shown in FIG. 6, the envelope generator 115 comprises two "adsr" registers 115a and 115b for holding the envelope settings "adsr 1, 2", an "adsr" controller 115c for determining the amplitude of an output of the pitch shifter 111 according to "adsr 1, 2" from the "adsr" registers 115a and 115b, and a multiplier 115d for calculating a product of the amplitude determined by the "adsr" controller 115c and the output of the pitch shifter 111. In operation, the CPU 51 reads from the main memory 53 "adsr1" and "adsr 2" corresponding to a selected VAG attribute and transmits them to the "adsr" registers 115a and 115b respectively. At the same time, it instructs the sound buffer 72 to read a waveform according to the VAG attribute. The waveform read from the sound buffer 72 is pitch shifted by the pitch shifter 111 and transferred across the switch 114 to the multiplier 115d. The "adsr" controller 115c produces an envelope, shown in FIG. 5, in response to "adsr 1, 2" from the "adsr" registers 115a and 115b and feeds it to the multiplier 115d. The multiplier 115 calculates a product of the output of the pitch shifter 111 and the envelope of the "adsr" controller 115c.

More specifically, a resultant audio waveform is generated by amplitude modification of the output of the pitch shifter 111 with the envelope generator 115. This action will be repeated for each voice. The VAG offset table contains "vagooffset" values indicative of the location of each VAG in the waveform section VB. The "vagoffset" is an offset number counted from the front end of the waveform section VB representing the location of the VAG identified by "vag" of the VAG. In operation, it is read out and sent by the CPU 51 to the SPU 71. The SPU 71 retrieves the VAG as is controlled with "vagoffset" from the sound buffer 72d. In advance, the bank VAB data has been picked up from the optical disk and stored on the main memory 53 or sound buffer 72. The bank header VH is read from the optical disk and stored in the main memory 53 while the waveform section VB is retrieved from the optical disk and held in the main memory 53 before being transferred to the sound buffer 72 for storage. They can be read and transferred through DMA transfers.

Figure 7:
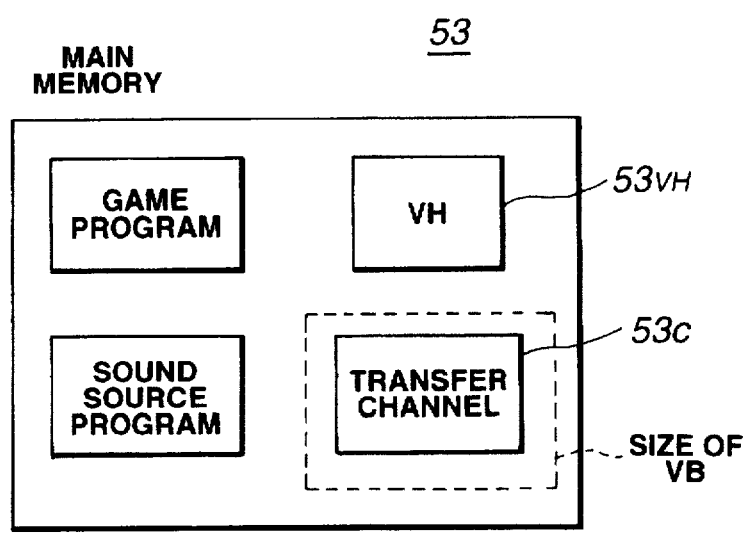
FIG. 7 is a diagram which illustrates storage of the attribute data.

More specifically, the main memory 53 has a bank header storage area 53VH for storage of the bank header VH and a channel area 53c for transmission of the waveform section VB, as shown in FIG. 7. The channel area 53c is smaller than the size of the waveform section denoted by the broken line of FIG. 7. The waveform section VB is thus divided into segments which are smaller in size than the channel area 53c and stored in a succession into the channel area 53c before being transferred to the sound buffer 72. Accordingly, the channel area 53c of the main memory 53 for transmission of the waveform data is minimized thus saving the storage area for game programs and contributing to the efficient use of the main memory 53. Also, the CPU 51 reads out various attributes from the main memory 53 and transfers them to the pitch shifter 111, the envelope generator 115, the volume devices 117L and 117R for selection of the VAG and determining its relevant settings. As a result, the waveforms stored in the sound buffer 72 are called for and utilized for producing a sound of each voice.

In this sound source device, the attribute and waveform data are stored in the main memory 53 and the sound buffer 72 respectively. When generation of a sound is requested, its attributes are retrieved from the main memory 52 and using the attributes, the waveforms are read from the sound buffer 72 to produce a sound signal. Because the attribute and waveform data from an optical disk are temporarily stored in the main memory 53 and sound buffer 72, they can easily be modified as desired. The sound reproduced is correlated with its image and provides BGM.

Figure 8:
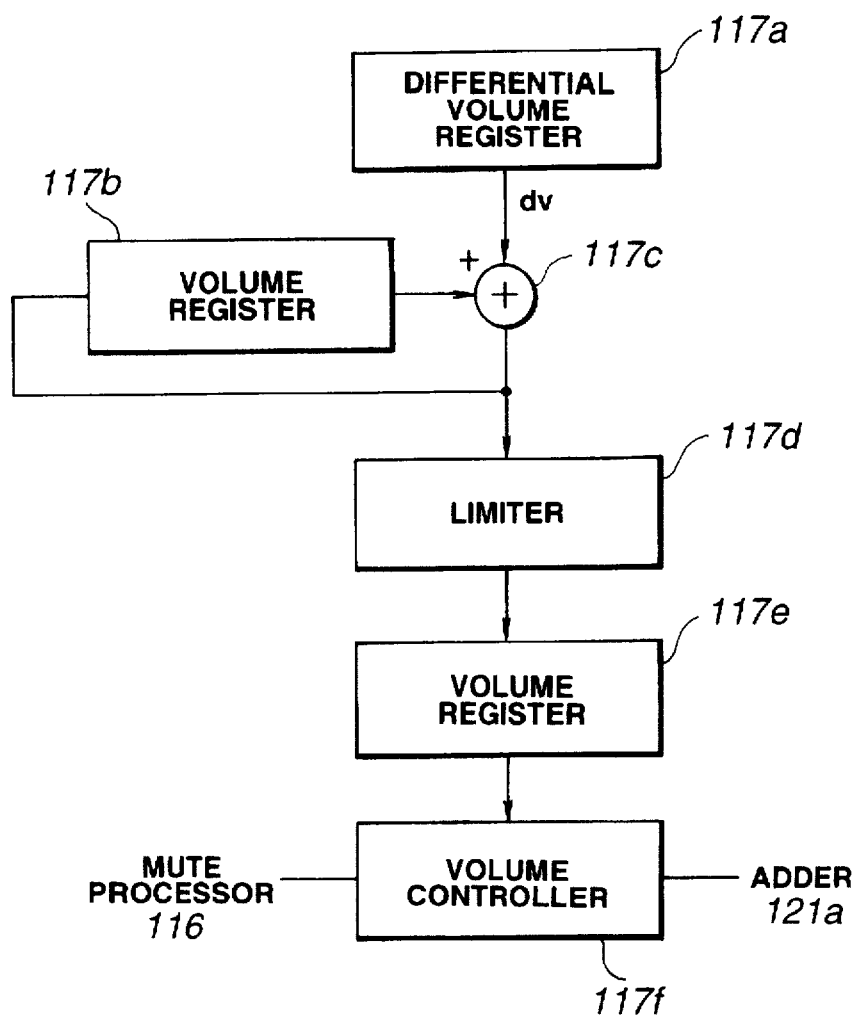
FIG. 8 is a schematic block diagram which illustrates a volume control for use in the sound source controller of the present invention.

The outputs of the envelope generator 115 and the two volume devices 117L and 117R can be controlled for left/right balancing not only with absolute values but also with a difference value between the two channels. This is done by a combination of the volume devices 117L and 117R, each comprising a differential volume register 117a for holding a differential volume level, a volume register 117b for holding a volume level, an adder 117c, a limiter 117d, another volume register 117e, and a volume controller 117f, as shown in FIG. 8.

The volume devices 117L and 117R are preset by the CPU 51 which supplies the volume level and differential level to the volume register 117a and the differential register 117b respectively. As the volume level and differential level have been given, their sum is calculated by the adder 117c at equal intervals of a clock signal and then transmitted to the limiter 117d and the volume register 117e. A difference between the volume level and the differential level is supplied to and held by the volume register 117d. Their sum is calculated upon delivery of the following clock pulse. As the differential volume level is being held, it is added to the volume level at each interval of the clock signal and the resultant sum output is varied continuously. For example, when the differential level is a positive value, the volume output will continuously be increased and when it is a negative value, the output will be decreased gradually.

Figure 9:
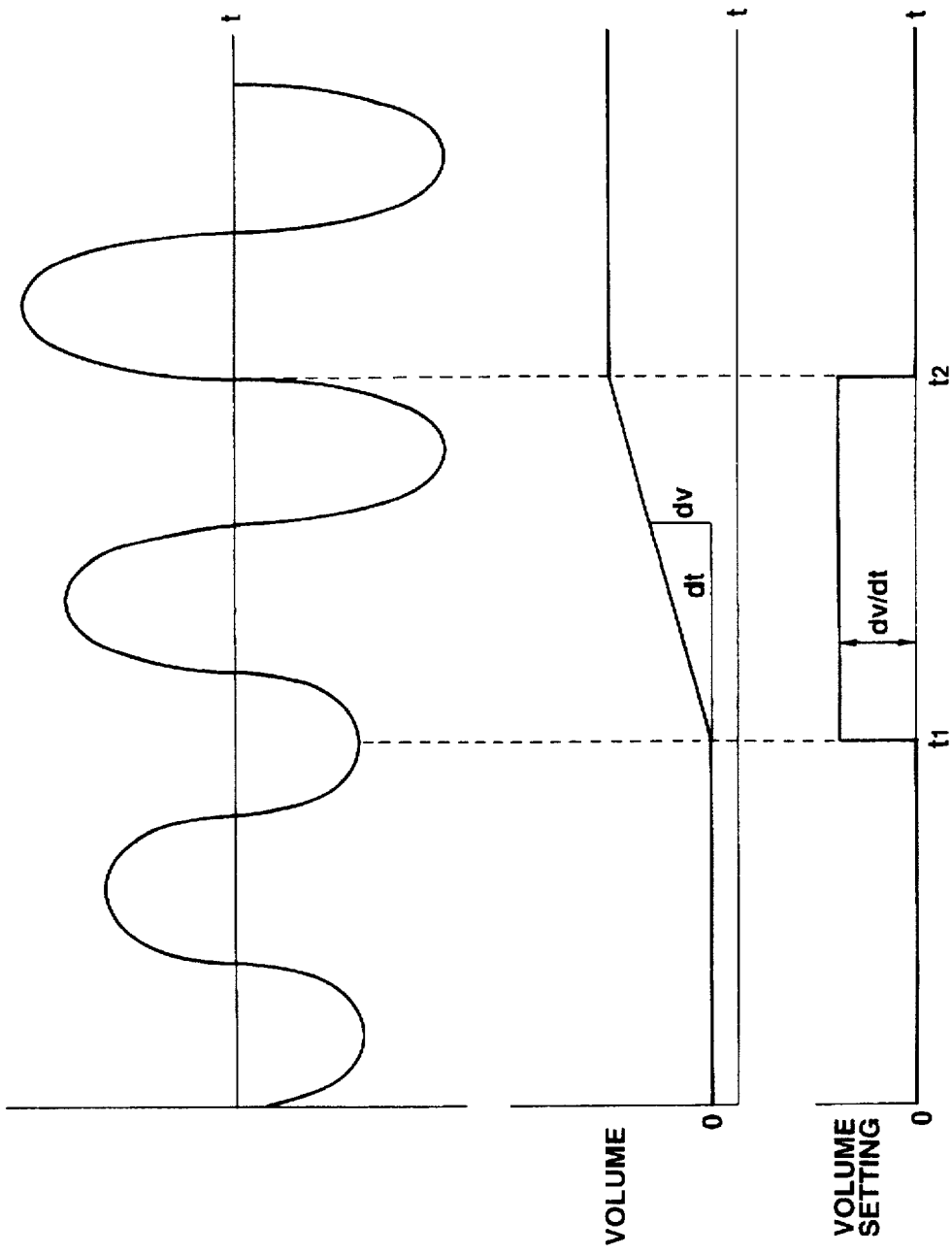
FIGS. 9 A-B are diagrams illustrating operation of the volume control.

The volume sum is then fed to the limiter 117d where it is limited and transferred to the volume register 117e. The volume controller 117f calculates a product of the output of the envelope generator 115 supplied across the mute processor 116 and the volume sum stored in the volume register 117e and sends it to the adder 121a. Accordingly, the output of the envelope generator 115 can be controlled to a desired volume level. Because the input of the volume level is controlled continuously, the output of the envelope generator 115 varies in succession. More particularly, if the differential volume level is set from time t1 to t2 as shown in FIG. 9(c), the volume sum will increase at a rate of dv/dt as shown in FIG. 9(b). Consequently, the volume controller 117f delivers a continuously increasing waveform shown in FIG. 9(a). This results in a continuous change in the reproduced sound and the generation of unwanted artifacts such as pop noise caused by discontinuous change is avoided. Also, because the volume output is gradually varied in proportion to the differential volume level, the setting of their values by the CPU 51 may be executed only once thus minimizing the load on the CPU 51.

It is understood that if the differential volume level is not given, the control of the volume device 117b by the adder 117c fails to be updated. With the volume level assigned to a constant value, the volume devices 117L and 117R remain functioning as common resistors. Also, because the clock signal for controlling the adder 117c is given at equal intervals of a time, it may be varied by predetermined settings of the SPU 71. A change in the interval between two clocks can be controlled by the CPU 51.

Figure 10:
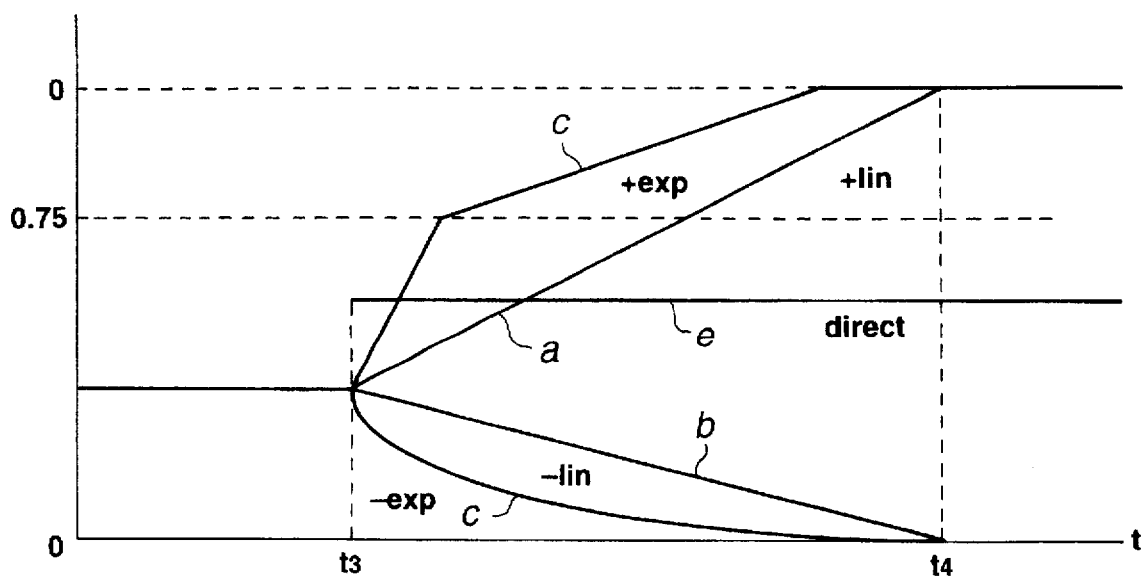
FIG. 10 is a diagram explaining an output produced by the volume control.

When the clock signal is introduced at equal intervals of time and the differential volume level is a positive value, the output level of the volume controller 117f increases linearly at a given rate as denoted by (a) in FIG. 10. If the differential volume level is a negative value, the output level is linearly decreased as denoted by (b) in FIG. 10. When the interval between the two clocks is continuously decreased with the differential volume level being a positive value, the output level of the volume controller 117f decreases nonlinearly or under an exponential function as denoted by (c) in FIG. 10. If the interval between two clocks is decreased in steps with the differential volume level being a positive value, the output level of the volume controller 117f increases according to a quasi-exponential function curve where the increment is gradually decreased as denoted by (d) in FIG. 10. As the output of the volume controller 117f is increased or decreased in an exponential function relationship, the change in the produced sound will be moderate and favorable to human ear perception even though the increment is made in steps as denoted by (e) in FIG. 10. This attenuates the generation of pop noises in the reproduced sound.

Figure 11:
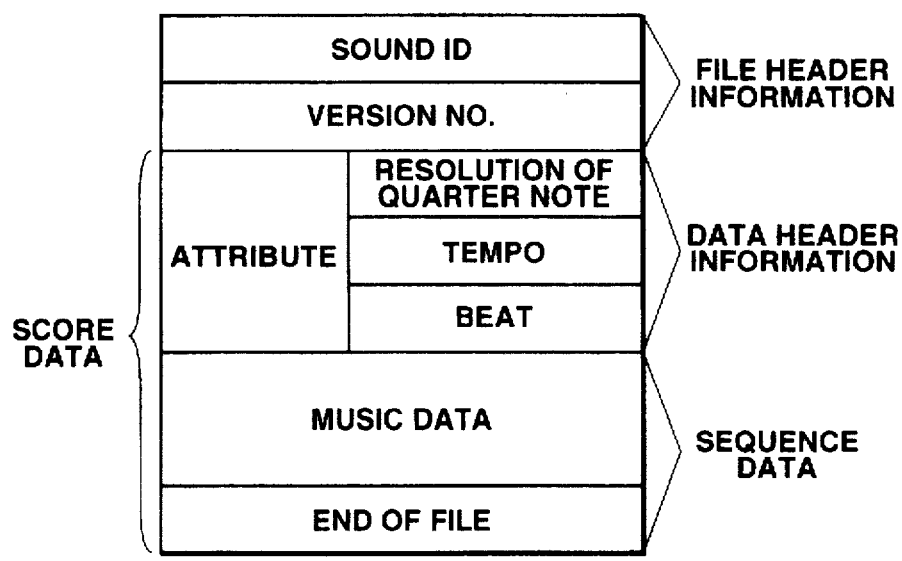
FIG. 11 is a diagram which illustrates a format of score data for controlling the sound source in the video game machine of the present invention.

It is essential for the sound source device that the sound source controlling program be carried out by the CPU 51. In a video-game machine, a variety of audio data including waveforms, tones, pitch, emission, termination, types, and others of special effects and BGM sounds are stored in the form of scores along with time data in the main memory 53. The audio data contained in scores are retrieved at equal intervals of time in a given sequence and used to assign the actions of pitch, emission, and termination registers which in turn produce a desired special effect or BGM sound. The score audio data is classified into either single score data consisting of a file of score data for playing a sequence of music, or joined score data consisting of a file for playing multiple sequences. As shown in FIG. 11, the single score data comprises a file header and score data of one sequence. The score data of one sequence includes a data header representing attributes of the score data and sequence information. The file header consists of a sound ID identifying the file as a sound data file and a version number identifying the version.

Figure 12:
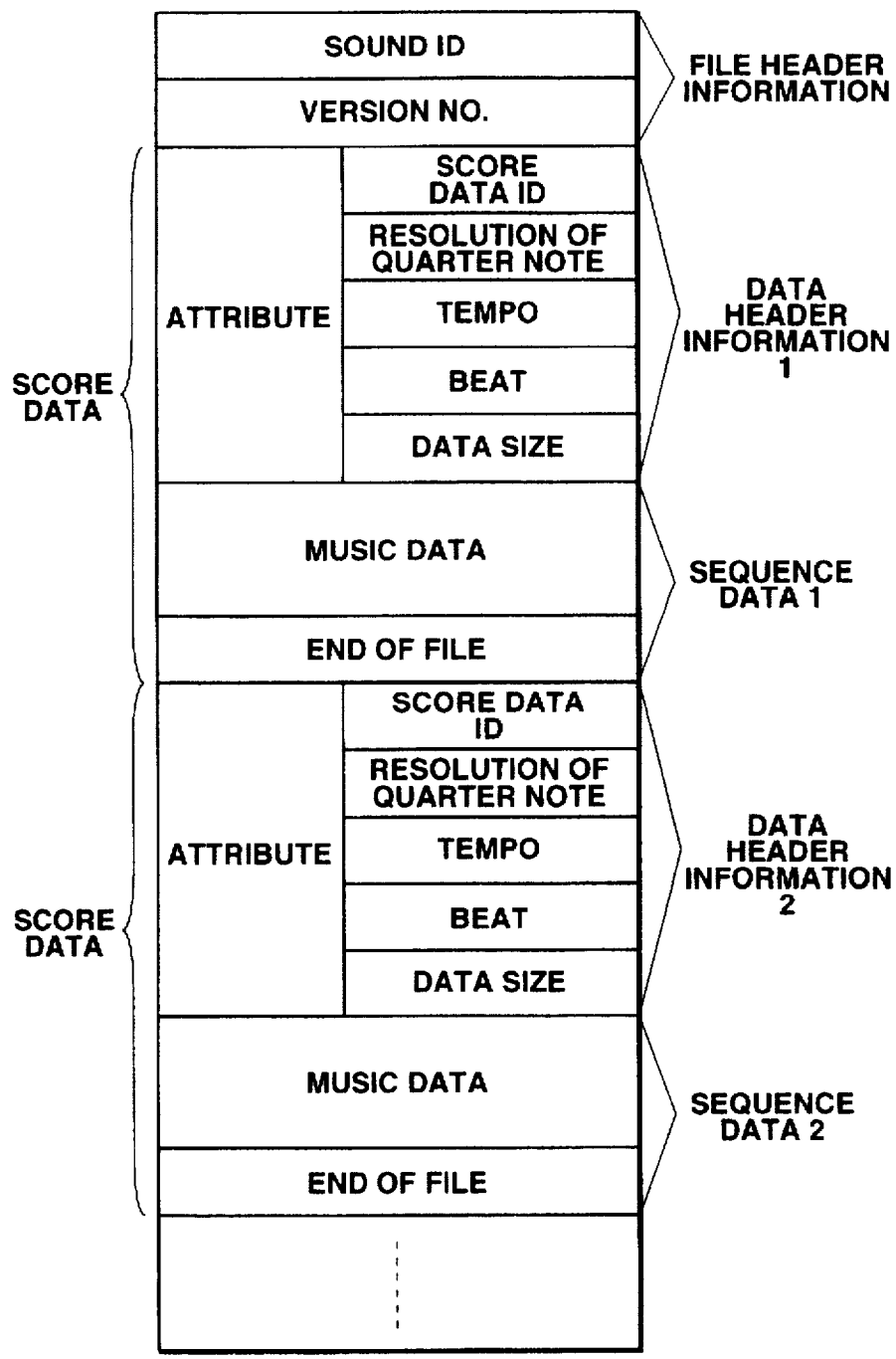
FIG. 12 is a diagram which illustrates another format of score data for controlling the sound source in the video game machine of the present invention.

The data header information includes time resolution and ¼ note resolution with tempo and beat of the score data, and tempo and beat of the music. The sequence information contains sound data representing multiple sounds in one sequence. As shown in FIG. 12, the joined score data comprises a file header and score data of multiple sequences. Similar to the single score data, the score data of each sequence includes data header information representing attributes of the score data and sequence information.

Figure 13:
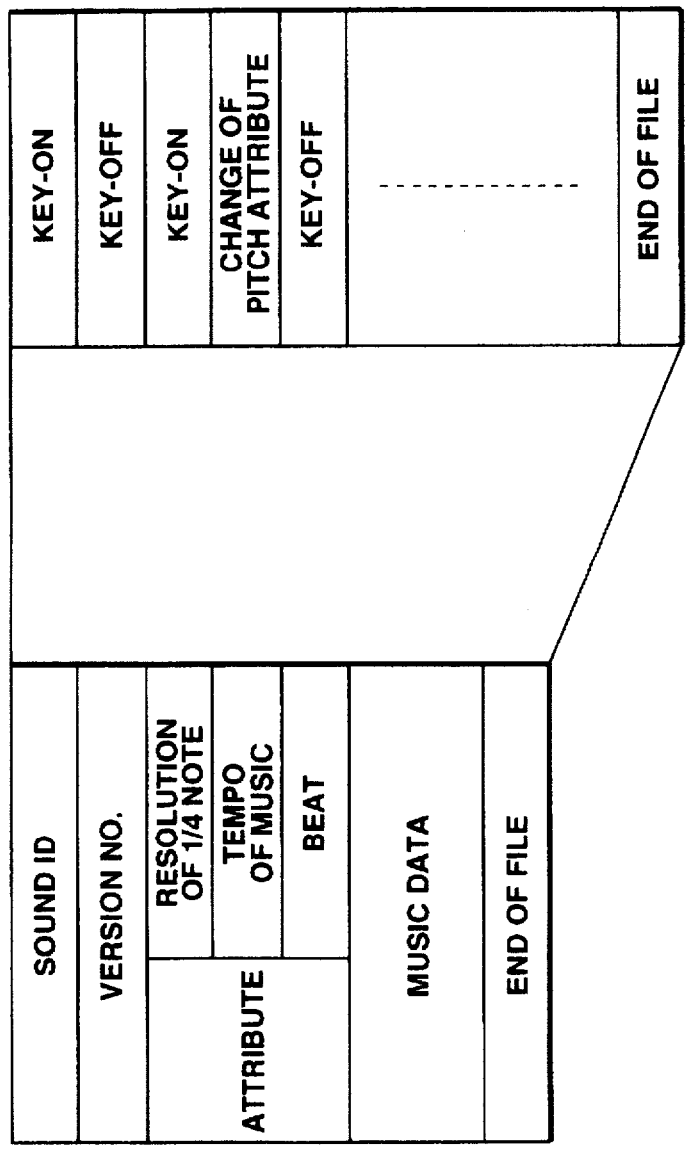
FIG. 13 is a diagram which illustrates a format of music data in the score data.
Figure 14:
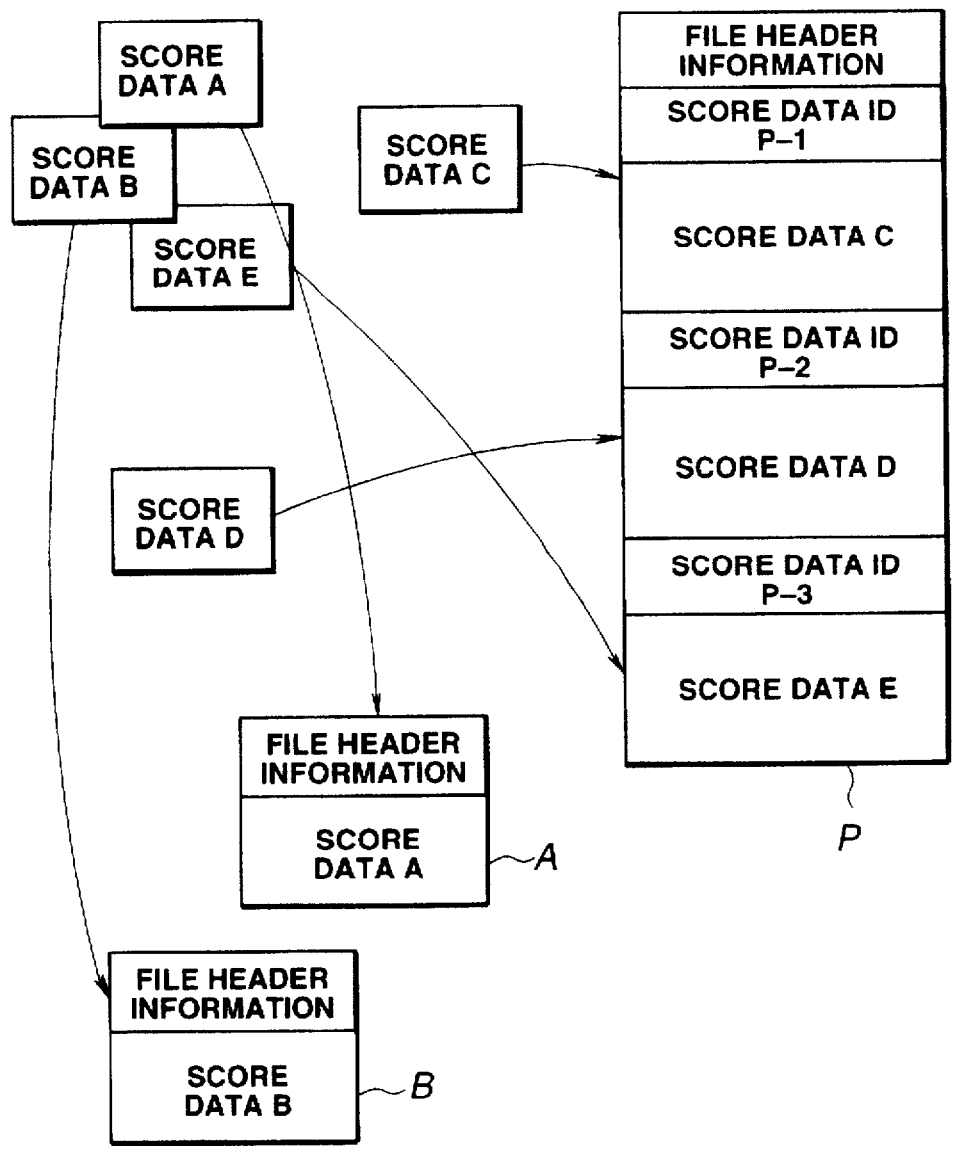
FIG. 14 is a diagram explaining assignment of the score data.

The data header information of the joined score data consists of a score data ID identifying the type of a score data which is followed by time resolution and ¼ note resolution with tempo and beat of the score data, and tempo and beat of music. As shown in FIG. 13, the sequence information in the joined score data contains key-on for starting a voice, key-off for terminating the voice, and pitch attribute change data for shifting the tone of a voice. This data is interpreted by the CPU 51 and used for controlling the sound source device as described above. The single or joined score data is based on score data of each sequence, as shown in FIG. 14.

For example, the single score data is composed of one score data A or B accompanied with its file header. Also, a joined score data P is constructed by joining score data C, D, and E with their respective score data IDs P-1, P-2, and P-3 and accompanying them with the file header. The score data IDs are aligned in order in the joined score data P. The single or joined score data stored in an optical disk is retrieved in advance for storage in the main memory 53. In processing, the single or joined score data is called for by the CPU 51 and reproduced by operation of the sound source controller implemented by the sound source controlling programs.

Figure 15:
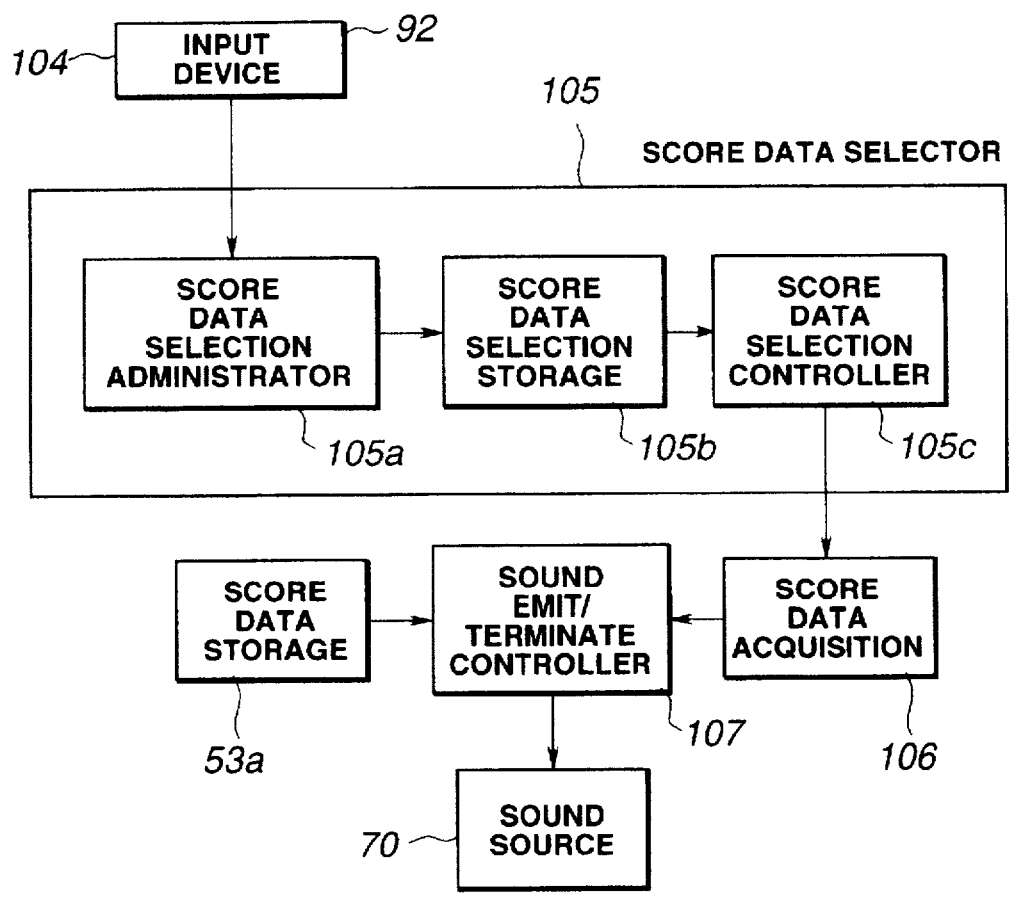
FIG. 15 is a schematic block diagram of the sound source controller for controlling the sound source with the score data.

The sound source controller may comprise the circuitry arrangement shown in FIG. 15 where either single or joined score data is used for controlling the sound source of the device. As shown, the sound source controller comprises an input device or controller 92, a score data selector 105 for selecting a desired one to be played back from a group of single or joined score data stored in the score data storage area 53a of the main memory 53. A score data acquisition unit 106 acquires the selected score data identified by the score data selector 105. An emission/termination data controller 107 controls the sound source or sound module 70. The score data selector 105 comprises a score data selection administrator 105a which is responsive to an input from the input device 92 for administering the score data to be selected. A score data selection storage 105b holds the contents of the score data, and a score data selection controller 105c analyzes the contents of the score data held in the score data selection storage 105b.

Figure 16:
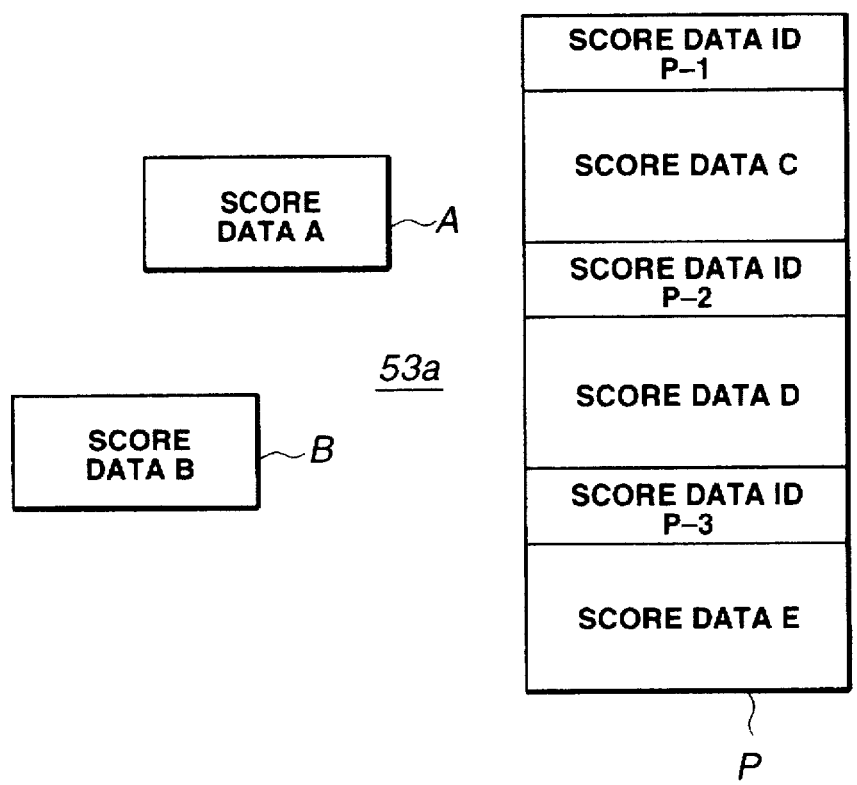
FIG. 16 is a diagram which illustrates assignment of the score data stored in a score data storage of the sound source device.

The single score data A, B and the joined score data P have their file headers deleted and are stored independently in the score data selection storage 53a, as shown in FIG. 16. Meanwhile, as score IDs 4 and 5 are assigned to their respective single score data A and B, they define the address in the score data selection storage 105a. Also, the score data C, D, and E of the joined score data P are accompanied with their respective score IDs 1, 2, and 3 and are stored at corresponding address locations as determined by the IDs. More specifically, address and pointer data identifying the storage locations of the score data are stored in a reference table of the main memory 53, as shown in FIG. 17(a). As shown, the reference table may be designed for assigning the score IDs 4 and 5 in the single score data A and B to two address locations ADDR1 and ADDR2 respectively, and to two pointers pt4 and pt5. Also, the score IDs 1, 2, and 3 of their respective score data C, D, and E in the joined score data P-1, P-2, and P-3 are assigned to three pointers pt1, pt2, and pt3 respectively in the reference table.

Figure 18:
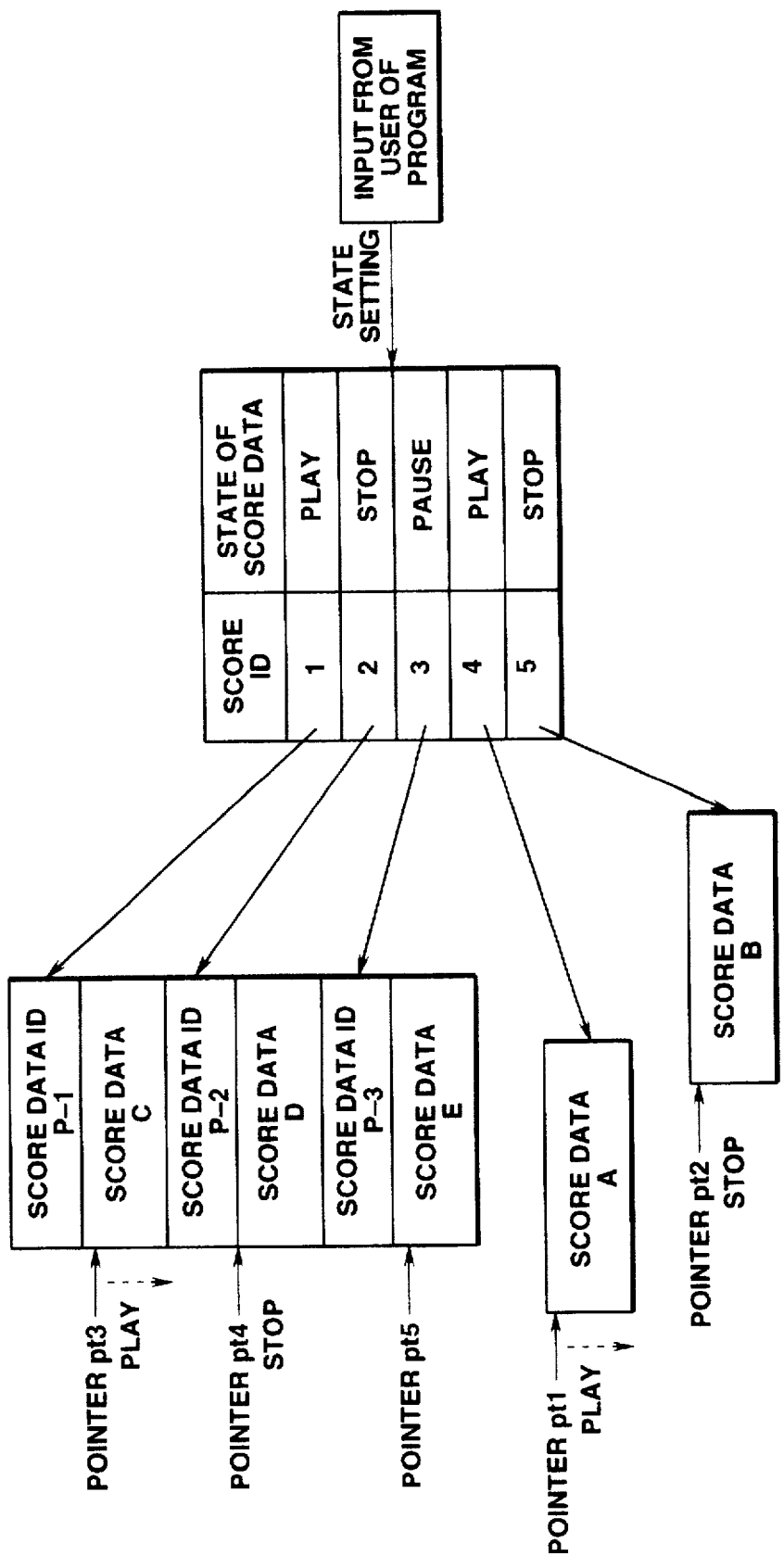
FIG. 18 is a diagram explaining reproduction of the score data in the sound source controller.

A start address reference table is also stored in the main memory 53. The letter P represents the score data ID assigned to start address SADDR1 where the joined score data P is saved, as shown in FIG. 17(b). Similarly, an offset address reference table is stored in the main memory 53, which assigns P-1, P-2, and P-3 of the score data ID to three different offset addresses respectively in relation to SADDR of the joined score data P, as shown in FIG. 17(c). For example, the offset address of P-1 is 0 because its score data C comes first in the joined score data. The offset addresses of P-2 and P-3 are thus OADDR1 and OADDR2 starting from SADDR of the score data D and E respectively. The score data in the single or joined score data can easily be read out by simply examining its score ID with reference to the reference table, start address reference table, and offset reference table. FIG. 18 illustrates operation of this system where any score data in the joined score data can be retrieved by specifying its score ID with much ease as compared with reading the address directly.

In the sound source controller, 24 voices in the sound source are allocated to a group of the score data respectively for reproduction. The reproduction of each score data is guided by a pointer on the reference table of the score data. The pointer points out the location of the score data during the reproducing process and it remains at the head of the score data when no reproduction is requested.

Figure 19:
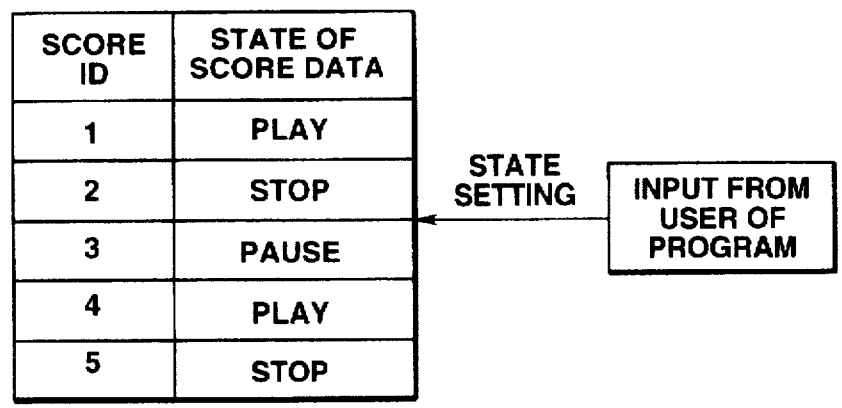
FIG. 19 is a diagram explaining operation of the score data in the sound source controller.
Figure 20:
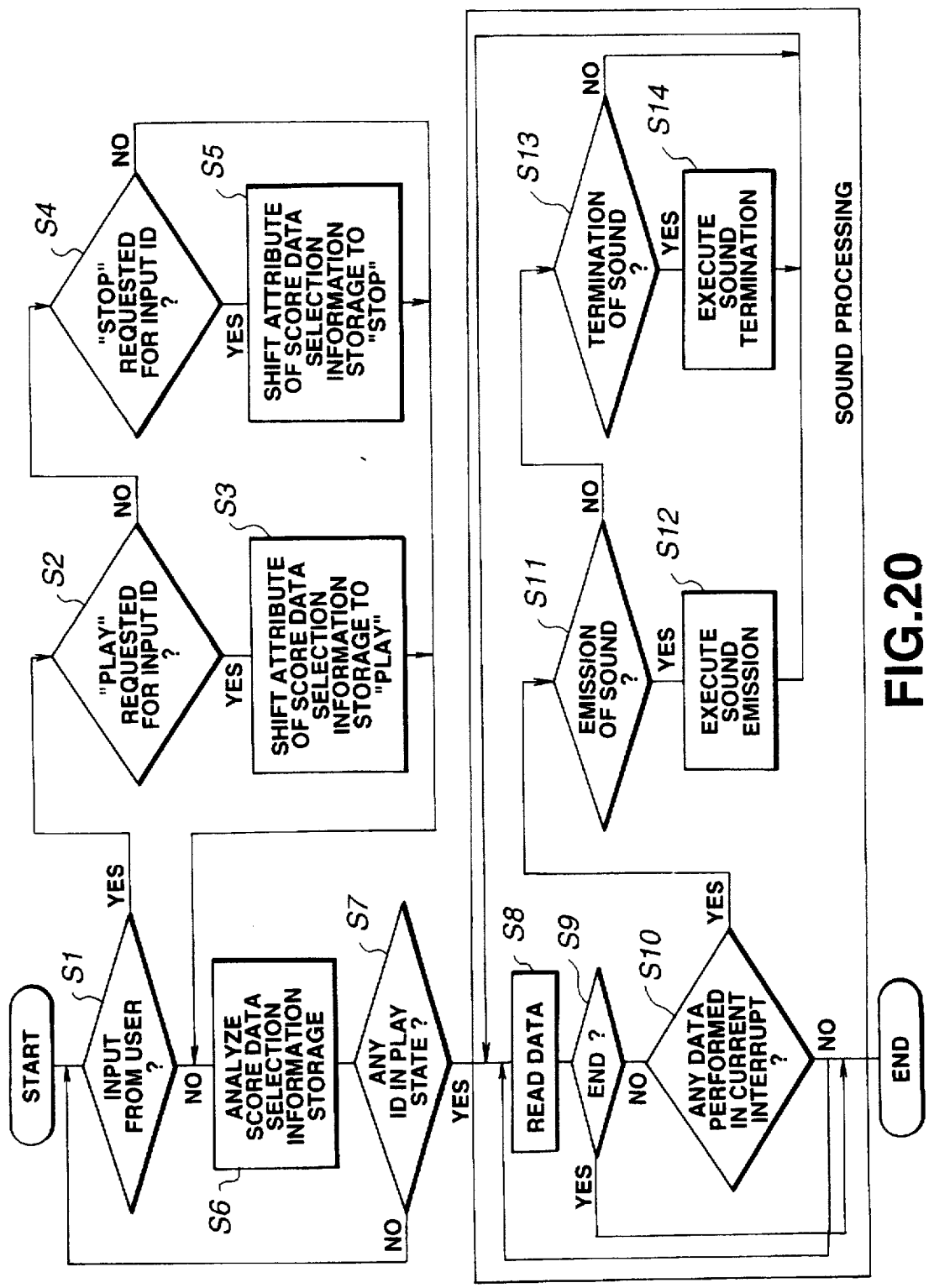
FIG. 20 is a flow chart explaining reproduction of the score data in the sound source controller.

In the score data storage 105b, some reproducing states of the score data corresponding to the numbers of the score ID are listed in a score data selection attribute table as shown in FIG. 19. The reproducing states are determined by setting commands from the input device 104 or from other programs. The reproducing state is identified as "stop" when no reproducing action is executed, "play" during the reproducing process, and "pause" when the reproducing process is temporality stopped. In the score data selection attribute table of FIG. 19, the score ID 1 represents the score data being reproduced, the score ID 2 indicates no reproduction of the score data, the score ID 3 is the score data being paused, the score ID 4 is the score data being reproduced, and the score ID 5 indicates that there is no reproduction of the score data. The reproducing process of a score data in a playback device will now be explained referring to the flow chart of FIG. 20.

When reproduction of the score data is requested, the procedure begins with Step S1 where the score data selection administrator 105a examines whether or not input from the input device 104 is provided. If there is input, the procedure moves to Step S2 and if not, the system continues with Step S6. In Step S2, the score data selection controller 105c examines whether or not the input represents a request with the score ID for reproducing its score data. If there is no request, the procedure goes to Step S4. If there is a request, the procedure advances to Step S3 where the state of the score data is turned to "play" as specified by the score ID in the score data selection storage 105b. In Step S4, the score data selection controller 105c examines whether or not the input represents a request for the score ID to stop its score data. If not, the procedure goes to Step S6 and if yes, it advances to Step S5 where the state of the score data is shifted to "stop" as specified by the score ID in the score data selection storage 105b before moving to Step S6. The score data selection controller 105c analyses the state of the score data specified by the score ID of the score data selection storage 105b at Step S6. Then, it is determined in Step S7 whether or not the score ID is "play". If not, the procedure returns to Step S1 and waits for introduction of another input. If the "play" score ID is present at Step S7, the procedure goes to Step S8 to start reproduction of the score data specified by the score ID.

The procedure after S8 is carried out on a score-data-by-score-data basis and is controlled by timer interrupt signals generated at equal intervals of time by the peripheral device controller 52. The description of this operation will be made with respect to one example of the score data. In Step S8, the score data acquisition unit 106 instructs the score data storage 53a to read relevant score data specified by the "play" score ID. The score data acquisition unit 106 examines whether or not the score data ends at Step S9. If it does end in step S9, the sound processing is terminated and if not, the procedure goes to Step S10.

In Step S10, the score data acquisition unit 106 examines whether or not the score data retrieved in Step S9 is the correct one to be reproduced during the current interrupt duration. If not, the sound processing will be ceased. If yes, the procedure moves to Step S11. In Step S11, the sound emission/termination controller 107 examines whether or not the score data to be reproduced in the current interrupt duration includes "key-on". If not the procedure goes to Step S13. If yes, the procedure advances to Step S12 where an instruction for emitting a corresponding voice is given to the sound source and moves back to Step S8 to stand by for the next interrupt signal.

The sound emission/termination controller 107 examines whether or not the score data to be reproduced in the current interrupt duration includes "key-off" at Step S13. If not the procedure goes back to Step S8 to wait for the next interrupt signal. If yes, the procedure advances to Step S14 where an instruction for terminating a corresponding voice is given to the sound source and returns back to Step S8 to stand by for the next interrupt signal. In this manner, the score data specified by a selected score ID is reproduced with the use of the score data selection attribute table.

In the sound source controller, any score data is easily identified by examining its score ID with reference to the reference tables and the control of the score data will be simplified. Because the reproducing state of the score data with its score ID is independently determined by modifying the contents of the score data selection attribute table, the reproduction of one score data can be implemented regardless of the reproduction states of the remaining score data. This allows the response to a request from the operator or a demand from the other program to be increased in speed.

Figure 21:
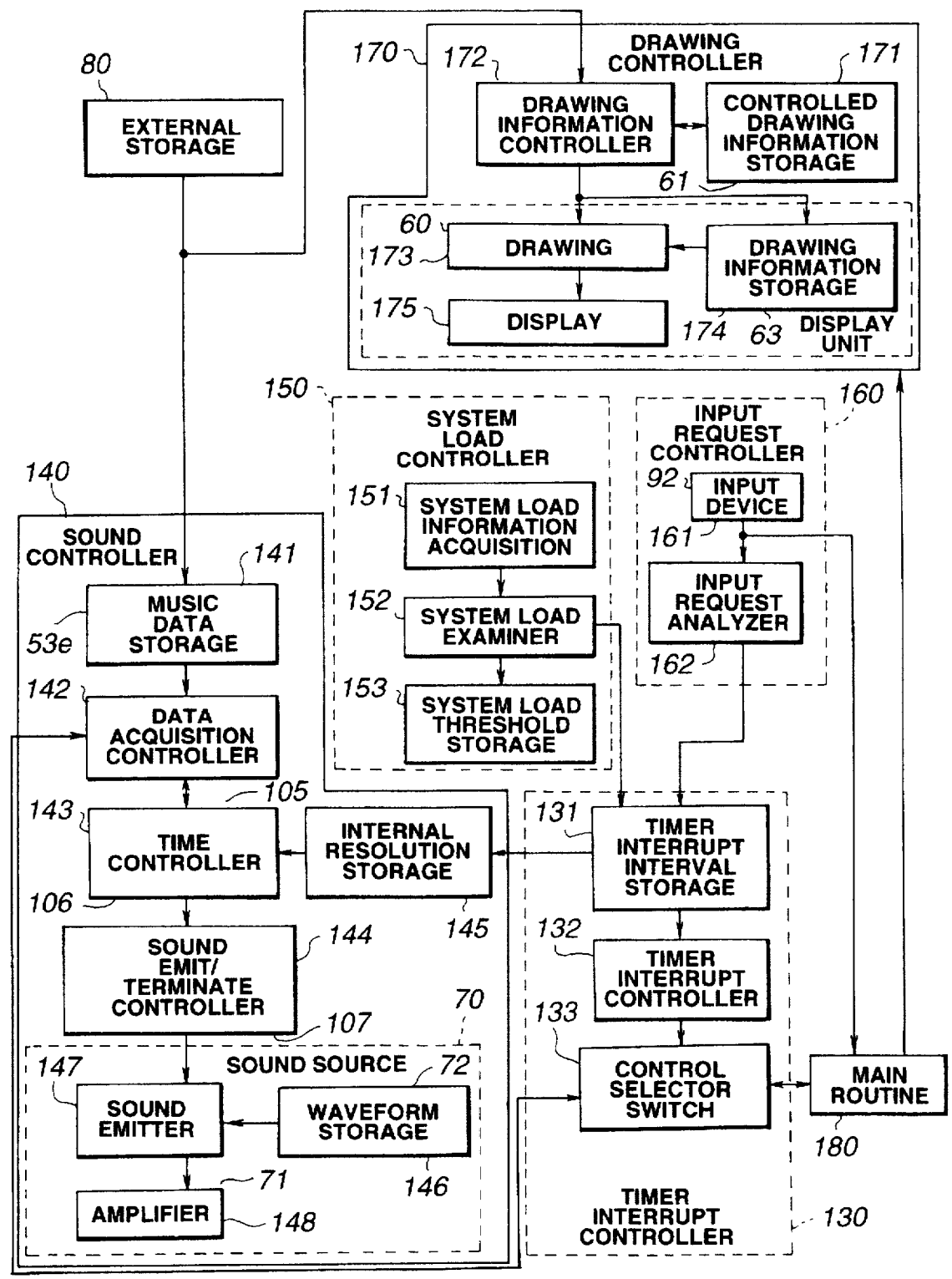
FIG. 21 is a schematic block diagram showing a detailed arrangement of the sound source controller of the present invention.

The sound source controller shown in FIG. 15 also includes the circuitry arrangement shown in FIG. 21. FIG. 21 is a block diagram representation of a sequence of actions controlled by the CPU 51 operating in accordance with the operating system, sound source control program, and game programs. The sound source controller includes a timer interrupt controller 130 for generating timer interrupt signals to the CPU 51 at equal intervals of time. Actions of the peripheral device controller 52, and sound controller 140 are responsive to timer interrupt actions of the peripheral device controller 52 for controlling the action of the sound source according to the score data. A system load controller 150 examines the load on the entire video-game machine. The system load controller 150 feeds its information to the timer interrupt controller 130, and an input request controller 160 for checking the action of the controller 92.

A drawing controller 170 controls drawing actions of the graphic module 60, and a main routine 180 responds to commands from the operator for controlling a sequence of game actions with a corresponding emission of special effects sounds, music and the display of images. These are controlled by the CPU 51 and are performed simultaneously with the actions of the sound controller 140 according to the operating system and game program. The timer interrupt controller 130 comprises a timer interrupt interval storage 131, a timer interrupt controller 132, and a control selector switch 133 for switching for action between the sound controller 140 and the main routine 180.

The sound controller 140 comprises, in addition to the sound source 70, a score data storage 141 for holding the score data, a data acquisition controller 142 for controlling the retrieval of the score data, a time controller 143 for controlling the action of the data acquisition controller 142, a sound emit/terminate controller 144 for controlling the emission and termination of sounds according to the score data, and an internal resolution storage 145 for holding internal resolution data corresponding to the timer interrupt interval data of the timer interrupt interval storage 131. The sound source 70 includes the SPU 71 and the sound buffer 72. More specifically, it comprises a sound emitter 147 responsive to an command from the sound emit/terminate controller 144 for reading a corresponding waveform from the sound buffer 72 or waveform storage 146, and an amplifier 148 for amplifying the waveform of the sound emitter 144. The sound emitter 147 and the amplifier 148 are actually provided as one unit of the SPU 71.

The system load controller 150 comprises a system load acquisition 151 for acquiring system load data and a system load examiner 152 for examining the system loading data. A system load threshold storage 153 holds the thresholds of the system load data. The input request controller 160 comprises an input device 161 including the controller 92, and an input request analyzer 162 for analyzing an input request. The drawing controller 170 is a combination of the CPU 51, the GTE 61, the GPU 62, and the frame buffer 63. More specifically, it comprises a during-control drawing data storage 171 including the GTE 61, a drawing data controller 172 including the CPU 51, a drawing device 173 including the GPU 62, a drawing data storage 174 including the frame buffer 63, and a display device 175 for displaying an image derived from a video output of the drawing device 173. The operation of the sound source controller will be explained in more detail below.

In the sound source controller, the timer interrupt interval data corresponding to system loads or request inputs are stored in the timer interrupt interval storage 131. For example, the timer interrupt interval data includes an interval of 1/240 second assigned to lower system loads and 1/60 of a second assigned to higher system loads which is longer than the interval at the lower system load. As the sound source controller is started, the main routine 180 while under controlled of the CPU 51 operates in parallel a group of actions for controlling the drawing controller 170 according to commands from the input device 161. The selecting of sounds is determined by the sound controller 140, and actuating the system load controller 150. The system load acquisition 151 receives load data from the CPU 51 and delivers it to the system load examiner 152. The system load examiner 152 examines the system load by comparing it with threshold values stored in the system load threshold storage 153 and delivers its comparison result to the timer interrupt interval storage 131.

The timer interrupt interval storage 131 determines a corresponding length of the timer interrupt interval from the result output of the system load examiner 152 or an output of the input request analyzer 162 and transfers it to the timer interrupt controller 132 and the internal resolution storage 145. More particularly, the timer interrupt interval storage 131 selects an interval of 1/240 second when the system load is low as judged by the system load examiner 152 and an interval of 1/60 of a second when the system load is high. The timer interrupt controller 132 controls the peripheral device controller 52 according to the timer interrupt interval from the timer interrupt interval storage 131. This results in the production of timer interrupt signals at equal intervals of the time. The control selector switch 133 actuates the main routine 180 and the sound controller 140 alternately at the equal intervals. This allows the sound controller 140 to perform its sound producing process.

Because the sound controller 140 is actuated by the switching action of the control selector switch 133, the time controller 143 according to the timer interruption interval or internal resolution stored in the internal resolution storage 145 instructs the data acquisition 142 to read out a timer interrupt interval length of the score data from the score data storage 141 and transmits it to the sound emit/terminate controller 144. The sound emit/terminate controller 144 controls the action of the sound emitter 147 in response to the length of the score data from the time controller 143. Accordingly, the sound emitter 147 produces a sound having a corresponding waveform selected from the waveform storage 146. More specifically, while the sound emit/ terminate controller 144 is being actuated, the CPU 51 determines the action of the pitch shifter 111 and the envelope generator 115 for producing a requested sound. The sound is then adjusted in amplitude by the amplifier 148 before being transferred to the loud speaker 73 for acoustic output. The sound is created by an audio signal of the score data for a length of the timer interrupt interval released from the timer interrupt interval storage 131.

Figure 22A:
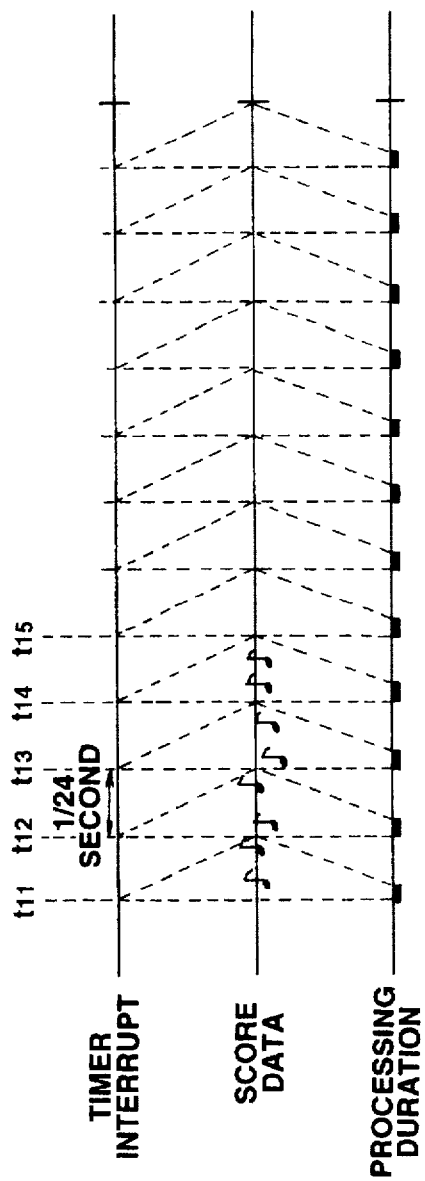
FIGS. 22 A-B are diagrams explaining timer interrupt operation of a sound controller in the sound source controller.

Because the sound controller 140 is actuated by the timer interrupt intervals which are determined by the timer interrupt interval storage 131, the timer interrupt interval lengths of the score data are released in succession. When the timer interrupt interval is 1/240 of a second, a 1/240-second length of the score data is reproduced as shown in FIG. 22(a).

Figure 22B:
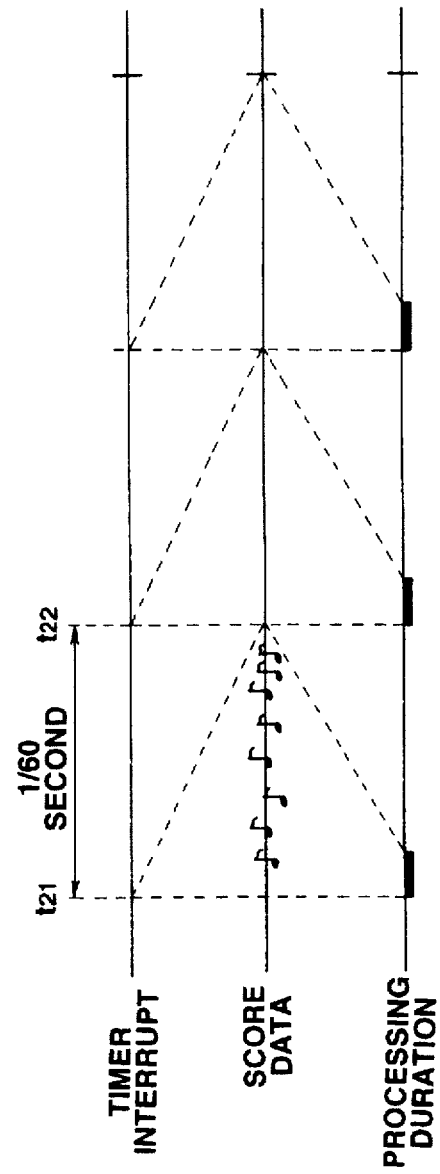
Figure 23A:
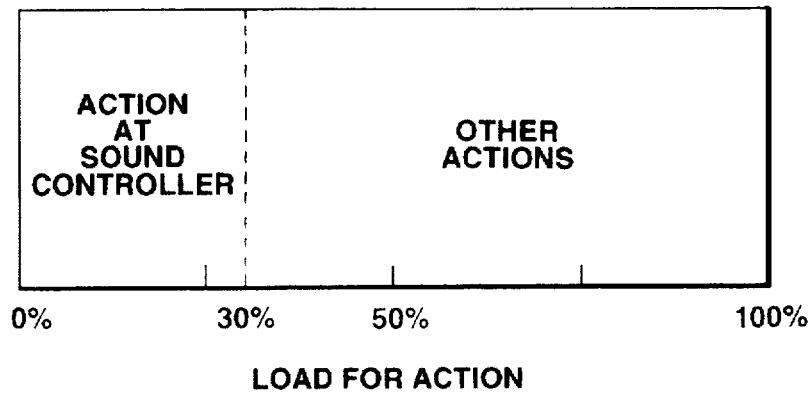
FIGS. 23 A-B are diagrams showing the ratio of the load for the sound controller.
Figure 23B:
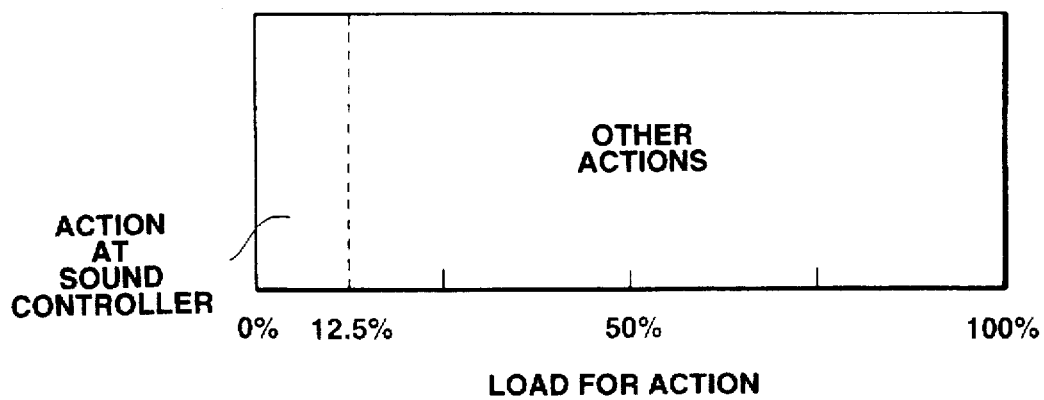
Figure 24:
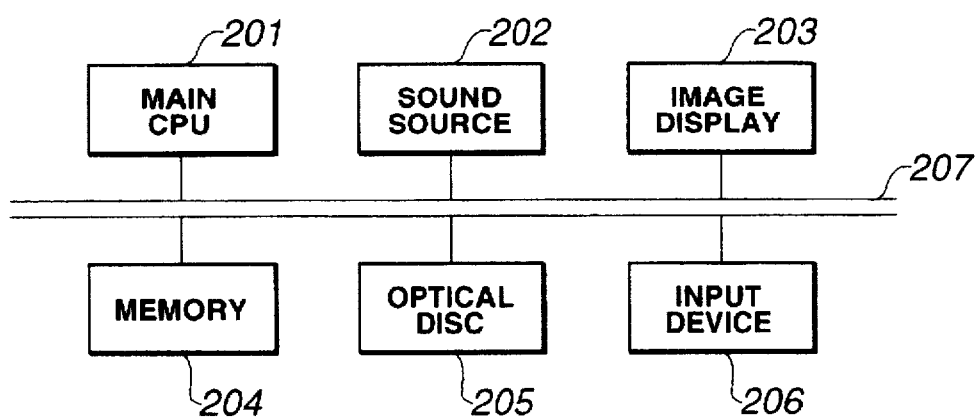
FIG. 24 is a block diagram showing an arrangement of a conventional video game machine.
Figure 26A:
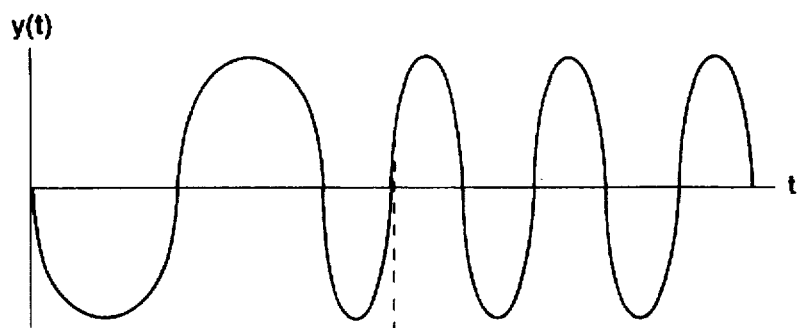
FIGS. 26 A-C are diagrams which explain operation of the known sound source device.
Figure 26B:
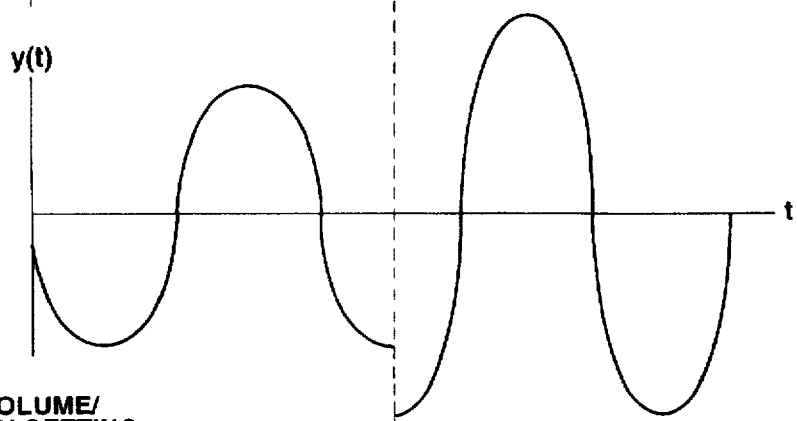
Figure 26C:
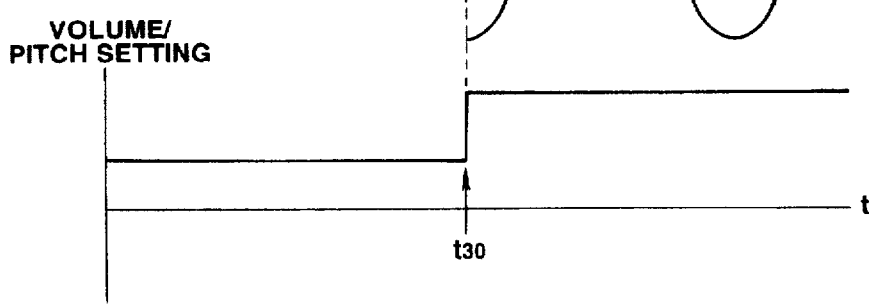

At that time, the actual processing duration in the sound controller 140 is much smaller than 1/240 second. For example, two notes are played during a period from t11 to t12, from t12 to t13, from t13 to t14, or from t14 to t15. A total of 8 notes are reproduced in 1/60 of a second from t11 to t15. When the timer interrupt interval is 1/60 of a second, a 1/60-second length of the score data is reproduced as shown in FIG. 22(b). Then, eight notes are played in 1/60 second from t21 to t22. Eight notes are played in the same length when the timer interrupt interval is either 1/240 or 1/60 of a second. Accordingly in the sound source controller, even if the timer interrupt interval is varied, the reading of the score data is controlled to match the interval. This allows the score data to be retrieved and played back at the same tempo. When the timer interrupt interval is 1/240 of a second, the action of the sound controller 140 triggered by the timer interrupt interval signal claims about 25% of the full load of the CPU 51 as shown in FIG. 23(a). However, when the timer interrupt interval is 1/60 of a second, the action of the sound controller 140 is as small as 12.5% of the processing capability of the CPU 51 as shown in FIG. 23(b).

It is clear that the load to the CPU 51 for controlling the action of the sound source hardly varies when the timer interrupt interval is decreased in length. However, when the timer interrupt interval is very short, the interrupt action more frequently occurs and the overhead for introducing an interruption is increased. This results in increase of the load to the sound controller 140. Therefore, the timer interrupt interval which is predetermined and stored in the timer interrupt interval storage 131 is selected to be 1/240 of a second when the system load is relatively low, allowing the sound controller 140 to handle more loads. It is selected to be 1/60 of a second when the system load is high, thus decreasing the load of the sound controller 140.

As a result, the processing capacity of the sound controller 140 in the sound source controller of the present invention is varied depending on the system load without changing the form of the score data. When the system load is very great, the sound controller 140 is less of a load to allow smooth processing of video data for drawing.

The foregoing embodiment of the present invention is not limited to the sound source device installed in a video-game machine for producing effect sounds and music but is applicable to any device, such as an automatic player or microcomputer, in which sounds are produced by adjusting the amplitude of a waveform according to predetermined amplitude data. It is also understood that other changes and modifications are possible without departing from the technological principles of the prevent invention.

As set forth above, the sound source device of the present invention allows a setting of the volume level to be varied according to a differential volume data which is predetermined and loaded so that the output of the pitch shifter can continuously be changed in amplitude. Subsequently, a resultant sound signal remains not discontinuous thus attenuating undesired noise in a reproduced sound. Because the volume level is gradually varied depending on the differential volume value, the sound source controller for controlling the action of the sound source is only once loaded with initial settings of the volume level and differential volume value. This allows the load of the sound source controller to be minimized.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A sound source device comprising:

a waveform buffer for storage of a waveform data;

a pitch converter means for reading out the waveform data from the waveform buffer and changing a pitch of the waveform data in accordance with pitch data;

an amplitude memory for holding amplitude data;

a differential amplitude memory for storing differential amplitude data;

a level modifying means for changing the amplitude data held in the amplitude memory based on the differential amplitude data held in the differential amplitude memory to provide an adjusted amplitude data; and a level controller for receiving an output of the pitch converter and adjusting an amplitude level of the output from the pitch converter based on the adjusted amplitude data to provide a gradually adjusted output.

2. The sound source device of claim 1, wherein a level of the adjusted output changes gradually.

3. The sound source device of claim 2, wherein a level of the adjusted output changes in accordance with a linear function.

4. The sound source device of claim 2, wherein a level of the adjusted output changes in accordance with an exponential function.

5. The sound source device of claim 1, wherein the level controller comprises a further memory means for storing further amplitude data and an adder for adding the further amplitude data to the differential amplitude data.

6. The sound source device of claim 1, further comprising a means for reverberating the adjusted output.

7. The sound source device of claim 1, further comprising a means for sensing a load on a CPU associated with the sound source device.

8. A method of producing an audio signal comprising the steps of:

providing waveform data;

changing a pitch of the waveform data to provide a pitch converted output;

storing amplitude data in an amplitude memory;

adjusting an amplitude level of the amplitude data in the amplitude memory based on differential amplitude data held in a differential amplitude memory to provide adjusted amplitude data; and adjusting a level of the pitch converted output based on the adjusted amplitude data held in an amplitude memory to provide a gradually adjusted output.

9. The method of producing an audio signal of claim 6, wherein the adjusted output changes gradually.

10. The method of producing an audio signal of claim 6, wherein the adjusted output changes in accordance with a linear function.

11. The method of producing an audio signal of claim 6, wherein the adjusted output changes in accordance with an exponential function.

* * * * *

UNITED STATES PATENT AND TRADEMARK OFFICE
CERTIFICATE OF CORRECTION

PATENT NO.   : 5,789,690
DATED        : August 4, 1998
INVENTOR(S)  : Makoto Furubashi et al.

It is certified that error appears in the above-identified patent and that said Letters Patent is hereby corrected as shown below:

Column 2,
Line 14, replace "volume register 225" with -- volumn register 224 --.

Column 5,
Line 45, replace "SPU 72" with -- SPU 71 --.

Column 7,
Line 49, replace "CPU 71" with -- SPU 71 --.

Column 10,
Line 14, replace "main memory 52" with -- main memory 53 --.
Line 33, replace "volume register 117a and the differential register 117b" with -- volume register 117b and the differential register 117a --.
Line 37, replace "a difference between" with -- a sum of --.
Line 39, replace "volume register 117d" with -- volume register 117b --.

Column 12,
Line 39, replace "score data selection storage 105a" with -- score data selection storage 105b --.

Column 15,
Line 9, replace "sound emitter 144" with -- sound emitter 147 --.

Claim 9,
Line 2, replace "an audio signal of claim 6" with -- an audio signal of claim 8 --.

Claim 10,
Line 4, replace "an audio signal of claim 6" with -- an audio signal of claim 8 --.

UNITED STATES PATENT AND TRADEMARK OFFICE
CERTIFICATE OF CORRECTION

PATENT NO. : 5,789,690
DATED : August 4, 1998
INVENTOR(S) : Makoto Furubashi et al.

It is certified that error appears in the above-identified patent and that said Letters Patent is hereby corrected as shown below:

Claim 11,
Line 7, replace "an audio signal of claim 6" with -- an audio signal of claim 8 --.

Signed and Sealed this

Sixteenth Day of April, 2002

Attest:

JAMES E. ROGAN
Attesting Officer   Director of the United States Patent and Trademark Office